US012665720B2

(12) United States Patent
Yoon et al.

(10) Patent No.: US 12,665,720 B2
(45) Date of Patent: Jun. 23, 2026

(54) METHOD AND DEVICE FOR GENERATING APERIODIC POSITIONING REFERENCE SIGNAL IN WIRELESS COMMUNICATION SYSTEM

(71) Applicant: Innovative Technology Lab Co., Ltd., Seoul (KR)

(72) Inventors: Sung Jun Yoon, Seoul (KR); Dong Hyun Park, Seoul (KR)

(73) Assignee: Innovative Technology Lab Co., Ltd., Seoul (KR)

( * ) Notice: Subject to any disclaimer, the term of this patent is extended or adjusted under 35 U.S.C. 154(b) by 348 days.

(21) Appl. No.: 18/323,267

(22) Filed: May 24, 2023

(65) Prior Publication Data

US 2023/0299923 A1 Sep. 21, 2023

Related U.S. Application Data

(63) Continuation of application No. PCT/KR2021/017583, filed on Nov. 26, 2021.

(30) Foreign Application Priority Data

Nov. 27, 2020 (KR) ........................ 10-2020-0162977

(51) Int. Cl.
 *H04L 5/00* (2006.01)
 *G01S 5/14* (2006.01)
(52) U.S. Cl.
 CPC .............. *H04L 5/0051* (2013.01); *G01S 5/14* (2013.01)

(58) Field of Classification Search
 CPC ....... H04L 5/0051; H04L 5/0048; G01S 5/14; G01S 5/0205; H04W 64/00; H04W 72/232
 See application file for complete search history.

(56) References Cited

U.S. PATENT DOCUMENTS

| | | | | |
|---|---|---|---|---|
| 10,218,471 | B1 * | 2/2019 | Kumar | ................ H04L 27/0012 |
| 2019/0302220 | A1 * | 10/2019 | Kumar | .................... H04W 4/44 |
| 2019/0369201 | A1 * | 12/2019 | Akkarakaran | ........ G01S 5/0236 |
| 2019/0380056 | A1 * | 12/2019 | Lee | ...................... H04B 7/0695 |
| 2019/0394747 | A1 * | 12/2019 | Akkarakaran | ........ H04L 5/0007 |
| 2020/0014487 | A1 | 1/2020 | Akkarakaran et al. | |
| 2020/0021946 | A1 * | 1/2020 | Kumar | .................. G01S 1/0428 |

(Continued)

FOREIGN PATENT DOCUMENTS

| | | | | | |
|---|---|---|---|---|---|
| WO | WO-2023079506 | A1 * | 5/2023 | ........ | H04W 56/0015 |
| WO | WO-2025172893 | A1 * | 8/2025 | .......... | H04W 52/243 |

OTHER PUBLICATIONS

European Search Report for European U.S. Appl. No. 21/898,657, dated Nov. 26, 2021.

(Continued)

*Primary Examiner* — Edan Orgad

(57) ABSTRACT

Provided is a method of estimating, by a user equipment (UE), a location in a wireless communication system. Here, the method of estimating, by the UE, the location may include receiving, from a base station, downlink control information (DCI) that includes aperiodic downlink (DL) positioning reference signal (PRS) related information; receiving a DL PRS from the base station through the aperiodic DL PRS related information included in the DCI that is received from the base station; and estimating the location based on the received DL PRS.

11 Claims, 16 Drawing Sheets

(56) References Cited

U.S. PATENT DOCUMENTS

| | | | | |
|---|---|---|---|---|
| 2020/0028768 A1* | 1/2020 | Sadiq | ............... | H04W 56/0045 |
| 2020/0092917 A1* | 3/2020 | Akkarakaran | .... | H04W 52/0248 |
| 2020/0112498 A1* | 4/2020 | Manolakos | ......... | H04J 13/0062 |
| 2020/0145860 A1* | 5/2020 | Koskela | ................ | H04W 76/14 |
| 2020/0145977 A1* | 5/2020 | Kumar | ............... | H04W 56/001 |
| 2020/0169336 A1* | 5/2020 | Modarres Razavi | .. | H04B 17/27 |
| 2020/0228381 A1 | 7/2020 | Manolakos et al. | | |
| 2021/0282106 A1* | 9/2021 | Xiong | ................... | H04W 64/00 |
| 2021/0282111 A1* | 9/2021 | Yamada | ............... | H04B 7/0695 |
| 2021/0293917 A1* | 9/2021 | Yuan | ..................... | H04L 5/0048 |
| 2021/0328747 A1* | 10/2021 | Da | ........................ | H04L 5/0058 |
| 2021/0409967 A1* | 12/2021 | Franke | ................. | H04W 16/28 |
| 2022/0026517 A1* | 1/2022 | Hasegawa | ............ | G01S 5/0236 |
| 2022/0038857 A1* | 2/2022 | Bi | ........................ | H04B 7/0695 |
| 2022/0053385 A1* | 2/2022 | Li | ........................ | H04W 36/085 |
| 2022/0113365 A1* | 4/2022 | Sosnin | ...................... | G01S 5/02 |
| 2022/0271818 A1* | 8/2022 | Svendsen | ............. | H04B 7/0897 |
| 2022/0283259 A1* | 9/2022 | Tao | ........................ | G01S 5/0036 |
| 2022/0322274 A1* | 10/2022 | Keating | ............... | H04W 64/00 |
| 2023/0112171 A1* | 4/2023 | Guo | ..................... | H04L 5/0051 |
| | | | | 370/336 |
| 2023/0127256 A1* | 4/2023 | Cha | ..................... | H04W 52/242 |
| | | | | 370/318 |
| 2023/0269696 A1* | 8/2023 | Lee | ...................... | H04W 24/10 |
| | | | | 455/456.1 |
| 2025/0323768 A1* | 10/2025 | Chung | ................. | H04W 24/08 |

OTHER PUBLICATIONS

European Office Action U.S. Appl. No. 21/898,657, dated Nov. 26, 2021.

Discussions on NR Positioning Enhancements; vol. RAN WG1, No. e-Meeting, Oct. 26-Nov. 13, 2020; Oct. 16, 2020; XP051940048, Retrieved from the Internet: URL:https://ftp.3gpp.org/tsg_ran/WG1_RL1/TSGR1_103-e/Docs/R1-2008226.zip RI-2008226.docx.

"FL Summary #10 for Potential Positioning Enhancements"; vol. RAN WG1, e-Meeting, Oct. 26-Nov. 13, 2020; Nov. 14, 2020; XP051954360, Retrieved from the Internet: URL:https://ftp.3gpp.org/tsg_ran/WG1_RL1/TSGR1_103-e/Docs/R1-2009679.zip RI-2009679 FL Summary #10 for NR PosEnh.docx.

Nokia et al: "On-demand PRS transmission and dynamic PRS resource allocation"; vol. RAN WG2, e-Meeting, Oct. 26-Nov. 13, 2020; Oct. 23, 2020; XP052363202, Retrieved from the Internet: URL:https://ftp.3gpp.org/tsg_ran/WG2_RL2/TSGR2_112-e/Docs/R2-2010161.zip R2-2010161 On-demand PRS.docx.

International Search Report for International Patent Application No. PCT/KR2021/017583, dated Mar. 2, 2022.

Written Opinion for International Patent Application No. PCT/KR2021/017583, dated Mar. 2, 2022.

"3rd Generation Partnership Project; Technical Specification Group Radio Access Network; LTE Positioning Protocol (LPP) (Release 16)", Sep. 2020, pp. 1-296, 3GPP TS 37.355 V16.2.0, 3GPP Organizational Partners.

Vivo, "Discussion on potential positioning enhancements", 3GPP TSG RAN WG1 #103-e, R1-2007666, e-Meeting, Oct. 26-Nov. 13, 2020, pp. 1-49.

Ericsson, "Enhancements for commercial use cases", 3GPP TSG-RAN WG2 #112e, R2-2010072, Electronic meeting, Nov. 2-13, 2020, pp. 1-12.

3GPP TS 38.211 V16.3.0 (Sep. 2020). 3rd Generation Partnership Project; Technical Specification Group Radio Access Network; NR; Physical channels and modulation (Release 16).

\* cited by examiner

FIG. 4

FIG. 6
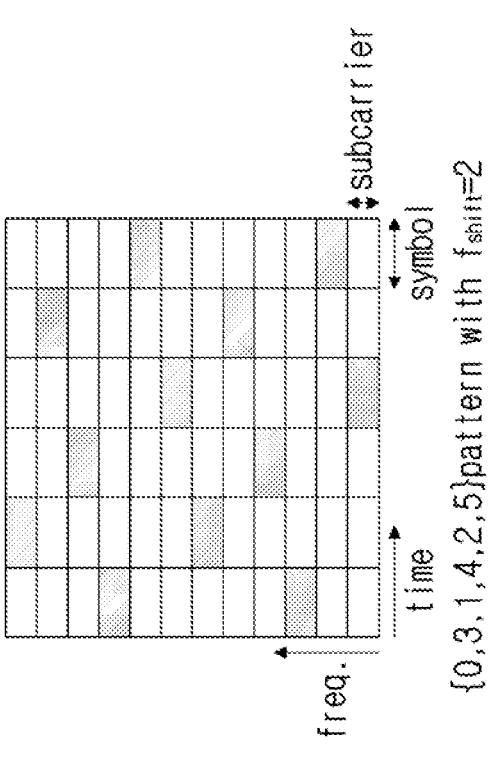
{0,3,1,4,2,5}pattern with f_shift=2
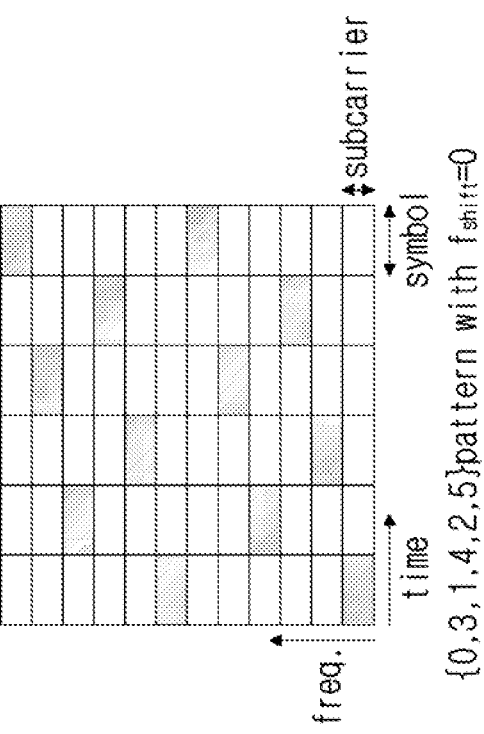
{0,3,1,4,2,5}pattern with f_shift=0

FIG. 7
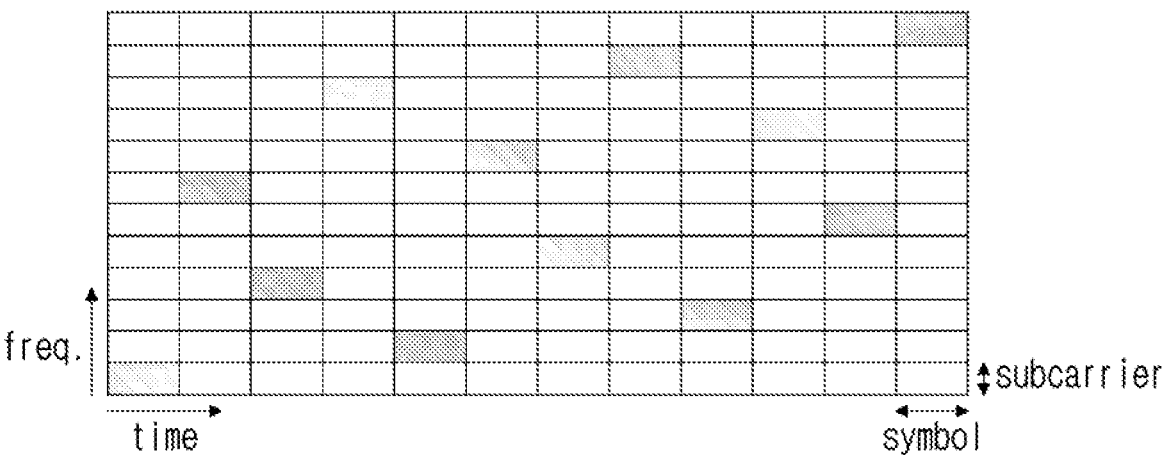
{0,6,3,9,1,7,4,10,2,8,5,11}pattern with $f_{shift}=0$
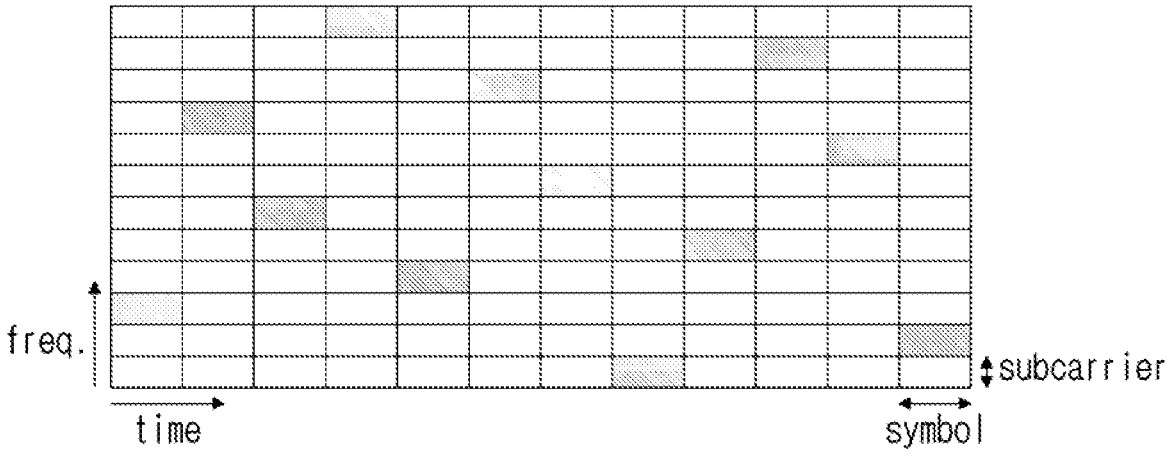
{0,6,3,9,1,7,4,10,2,8,5,11}pattern with $f_{shift}=2$ FIG. 8
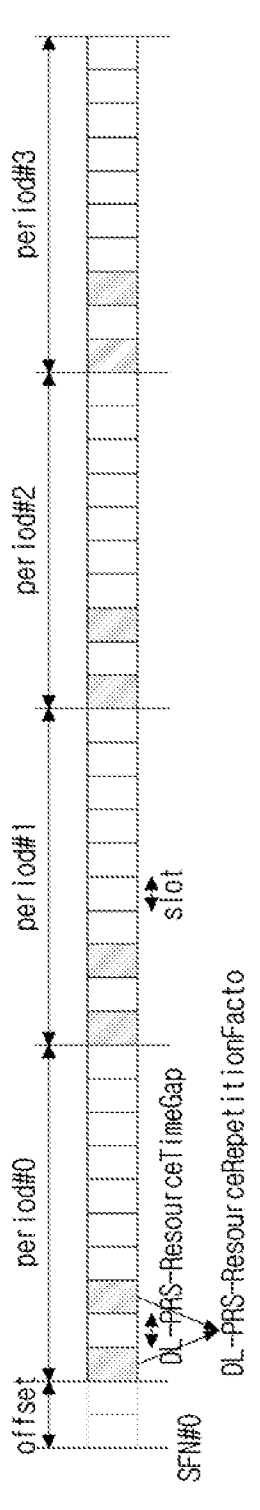
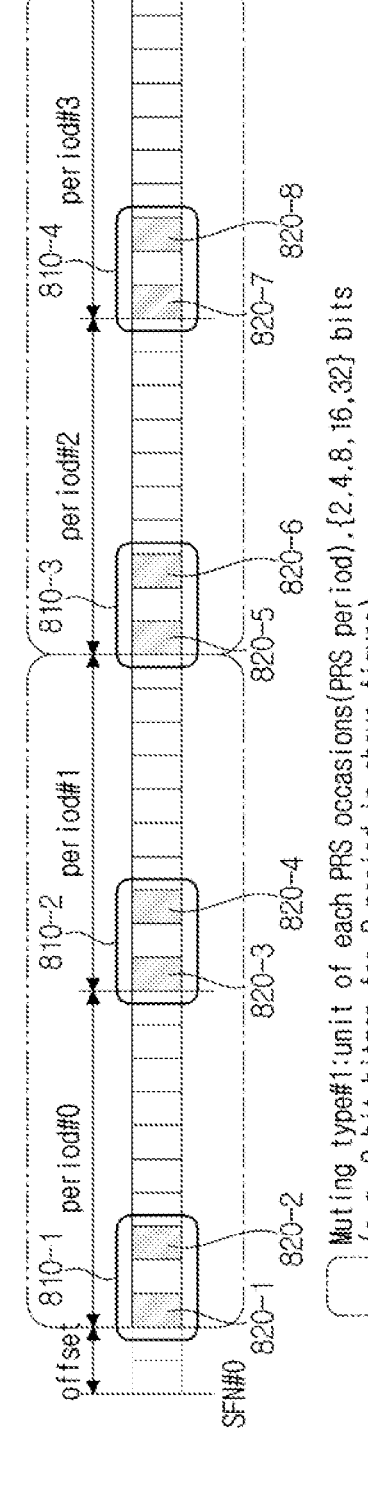

Potential PBCH        Actually used SS block        Unused SS block

Beam pattern across SS blocks within SS burst (a)

(b)

Target coverage area

NR-PhysCellID-r16=A, rs-Type-r16=typeD or typeC-plus-typeD

Best beams for UE A →

| ssb-Index-r16 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| NR-DL-PRS-ResourceSetID-r16 | X | X | X | X | X | X | X | X | X | X | X | X | X | X | X | X | X | X | X | X | X | X | X | X | X | X | X | X | X | X | X | X |
| NR-DL-PRS-ResourceID-r16 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| NR-DL-PRS-ResourceSetID-r16 | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y |
| NR-DL-PRS-ResourceID-r16 | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 3 | 3 | 3 | 3 | 3 | 3 | 3 | 3 |

| ssb-Index-r16 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|
| NR-DL-PRS-ResourceSetID-r16 | X | X | X | X | X | X | X | X | X | X | X | X | X | X | X | X | X | X | X | X | X | X | X | X | X | X | X | X | X | X | X | X |
| NR-DL-PRS-ResourceID-r16 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
| NR-DL-PRS-ResourceSetID-r16 | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y | Y |
| NR-DL-PRS-ResourceID-r16 | 4 | 4 | 4 | 4 | 4 | 4 | 4 | 4 | 5 | 5 | 5 | 5 | 5 | 5 | 5 | 5 | 6 | 6 | 6 | 6 | 6 | 6 | 6 | 6 | 7 | 7 | 7 | 7 | 7 | 7 | 7 | 7 |

← Best beams for UE B

METHOD AND DEVICE FOR GENERATING APERIODIC POSITIONING REFERENCE SIGNAL IN WIRELESS COMMUNICATION SYSTEM

CROSS-REFERENCE TO RELATED APPLICATIONS

This application is a continuation of International patent application No. PCT/KR2021/017583, filed on Nov. 26, 2021, which claims priority from and the benefit of Korean Patent Application No. 10-2020-0162977, filed on Nov. 27, 2020, each of which is hereby incorporated by reference in its entirety.

BACKGROUND

The present disclosure relates to a method of generating an aperiodic positioning reference signal (PRS) in a wireless communication system, and more particularly, to a method and apparatus for generating an aperiodic downlink (DL) PRS for positioning in new radio (NR).

Positioning may represent an operation of estimating a location. When estimating a location of a user equipment (UE) based on positioning in a wireless communication system, requirements that consider a use case or a scenario need to be satisfied although some errors are present in location estimation. Here, horizontal positioning requirements may be set within 3 m (80%) according to an internal environment scenario of the applied wireless communication system and horizontal positioning requirements may be set within 10 m (80%) according to an external environment scenario.

Meanwhile, in the case of considering the industrial Internet of things (IIoT) as a new application and industrial structure, requirements for a positioning error may be set to be high. For example, requirements for a sub-meter level positioning error may be set within 1 m. Also, requirements for a positioning error for the IIoT may be set within 0.2 m.

Therefore, there is a need for a new positioning reference signal (PRS) generation method for positioning to satisfy requirements required according to development of a wireless communication system and technical change.

SUMMARY

A technical subject of the present disclosure may provide a method and apparatus for generating a positioning reference signal (PRS) in a wireless communication system.

A technical subject of the present disclosure may provide a method and apparatus for generating an aperiodic PRS in a wireless communication system.

The present disclosure may provide a method and apparatus for generating a PRS for positioning in consideration of an industrial Internet of things (IIoT) environment in a wireless communication system.

The present disclosure may provide a method and apparatus for generating a downlink (DL) PRS in a wireless communication system.

The present disclosure may provide a method and apparatus for generating a sounding reference signal (SRS) for positioning in a wireless communication system.

The features briefly abstracted above with respect to the present disclosure are merely aspects of the detailed description of this disclosure and are not provided to limit the scope of the disclosure.

According to an aspect of the present disclosure, a method of estimating, by a user equipment (UE), a location in a wireless communication system may be provided. Here, the method of estimating, by the UE, the location may include receiving, from a base station, downlink control information (DCI) that includes aperiodic downlink (DL) positioning reference signal (PRS) related information; receiving a DL PRS from the base station through the aperiodic DL PRS related information included in the DCI that is received from the base station; and estimating the location based on the received DL PRS.

Also, according to an aspect, a method of estimating, by a UE, a location in a wireless communication system may be provided. Here, the method of estimating, by the UE, the location may include transmitting on-demand DL PRS request information to a base station; receiving, from the base station, DCI that includes DL PRS related information based on the on-demand DL PRS request information; receiving a DL PRS from the base station through the aperiodic DL PRS related information included in the DCI that is received from the base station; and estimating the location based on the received DL PRS.

According to the present disclosure, there may be provided a method and apparatus for generating an aperiodic downlink (DL) positioning reference signal (PRS) in a wireless communication system.

According to the present disclosure, there may be provided a method and apparatus for generating an aperiodic DL PRS to reduce latency in consideration of an industrial Internet of things (IIoT) scenario.

According to the present disclosure, there may be provided a method and apparatus for setting an aperiodic DL PRS related parameter based on a periodic DL PRS parameter.

According to the present disclosure, there may be provided a method of efficiently using, by a UE, a resource in an aperiodic DL PRS.

According to the present disclosure, there may be provided a PRS configuration method that considers latency and device efficiency by indicating whether to use all of an aperiodic DL PRS and a periodic DL PRS.

The effect that may be achieved from the present disclosure is not limited to the aforementioned effect and other effect not described herein may be clearly understood by those skilled in the art from the following description.

BRIEF DESCRIPTION OF THE DRAWINGS

FIG. 4 illustrates a configuration of a control plane and a user plane for an LTE positioning protocol (LPP) related to the present invention to which the present disclosure may apply.

FIG. 6 illustrates a method of performing cyclic prefix based on a current DL PRS allocation pattern to which the present disclosure may apply.

FIG. 7 illustrates a method of performing cyclic prefix based on a current DL PRS allocation pattern applicable to the present disclosure.

FIG. 8 illustrates a DL PRS resource allocation method applicable to the present disclosure.

FIG. 12 illustrates a structure of a synchronization signal frame in the case of considering transmission through a plurality of beams in a synchronization signal transmission to which the present disclosure may apply.

FIG. 13 illustrates a best beam of a UE to which the present disclosure may apply.

DETAILED DESCRIPTION

Figure 1:
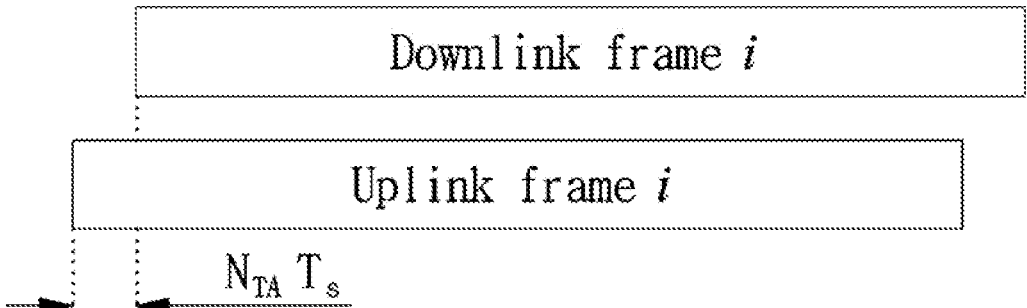
FIG. 1 illustrates an example of a new radio (NR) frame structure to which the present disclosure may apply.

Various examples of the present disclosure will be described more fully hereinafter with reference to the accompanying drawings such that one of ordinary skill in the art to which the present invention pertains may easily implement the examples. However, the present disclosure may be implemented in various forms and is not limited to the examples described herein.

In describing the examples of the present disclosure, detailed description on known configurations or functions may be omitted for clarity and conciseness. Throughout the drawings and the detailed description, unless otherwise described, the same drawing reference numerals are understood to refer to the same elements, features, and structures.

It will be understood that when an element is referred to as being "connected to," "coupled to," or "accessed to" another element, it can be directly connected, coupled, or accessed to the other element or intervening elements may be present. Also, it will be further understood that when an element is described to "comprise/include" or "have" another element, it specifies the presence of still another element, but do not preclude the presence of another element uncles otherwise described.

Further, the terms, such as first, second, and the like, may be used herein to describe elements in the description herein. The terms are used to distinguish one element from another element. Thus, the terms do not limit the element, an arrangement order, a sequence or the like. Therefore, a first element in an example may be referred to as a second element in another example. Likewise, a second element in an example may be referred to as a first element in another example.

Herein, distinguishing elements are merely provided to clearly explain the respective features and do not represent that the elements are necessarily separate from each other. That is, a plurality of elements may be integrated into a single hardware or software unit. Also, a single element may be distributed to a plurality of hardware or software units. Therefore, unless particularly described, the integrated or distributed example is also included in the scope of the present disclosure.

Herein, elements described in various examples may not be necessarily essential and may be partially selectable.

Therefore, an example including a partial set of elements described in an example is also included in the scope of the present disclosure. Also, an example that additionally includes another element to elements described in various examples is also included in the scope of the present disclosure.

The description described herein is related to a wireless communication network, and an operation performed in a wireless communication network may be performed in a process of controlling a network and transmitting data by a system that controls a wireless network, e.g., a base station, or may be performed in a user equipment connected to the wireless communication network.

It is apparent that various operations performed for communication with a terminal in a network including a base station and a plurality of network nodes may be performed by the base station or by other network nodes in addition to the base station. Here, the term 'base station (BS)' may be interchangeably used with other terms, for example, a fixed station, a Node B, eNodeB (eNB), gNodeB (gNB), and an access point (AP). Also, the term 'terminal' may be interchangeably used with other terms, for example, user equipment (UE), a mobile station (MS), a mobile subscriber station (MSS), a subscriber station (SS), and a non-AP station (non-AP STA).

Herein, transmitting or receiving a channel includes a meaning of transmitting or receiving information or a signal through the corresponding channel. For example, transmitting a control channel indicates transmitting control information or a signal through the control channel. Likewise, transmitting a data channel indicates transmitting data information or a signal through the data channel.

In the following description, although the term "new radio (NR) system" is used to distinguish a system according to various examples of the present disclosure from the existing system, the scope of the present disclosure is not limited thereto.

A new radio (NR) system supports various subcarrier spacings (SCSs) by considering various scenarios, service requirements, potential system compatibility, and the like. Also, to overcome a poor channel environment, such as high pathloss, phase-noise, and frequency offset, occurring on a high carrier frequency, the NR system may support transmission of a physical signal/channel through a plurality of beams. Through this, the NR system may support applications, for example, enhanced Mobile Broadband (eMBB), massive Machine Type Communications (mMTC)/ultra Machine Type Communications (uMTC), and Ultra Reliable and Low Latency Communications (URLLC).

Here, 5G mobile communication technology may be defined by including the existing Long Term Evolution-Advanced (LTE-A) system as well as the aforementioned NR system. That is, 5G mobile communication technology may operate by considering backward compatibility with a previous system as well as a newly defined NR system. Therefore, following 5G mobile communication may include technology operating based on the NR system and a technology operating based on a previous system (e.g., LTE-A, LTE), and is not limited to a specific system.

A positioning field to which the present disclosure applies relates to positioning technology in an NR system and may include a portion of positioning technology in an LTE system in consideration of backpropagation with a previous system. Hereinafter, for clarity of description, an operation for positioning and related information are described based on the NR system. Here, features of example embodiment(s) of the present disclosure may not be limitedly applied only to a specific system and may also be applied alike to other systems that are implemented in a similar manner and are not limited to an exemplary system to which the example embodiment(s) of the present disclosure are applied.

First of all, the physical resource structure of the NR system to which the present disclosure is applied will be briefly described.

FIG. 1 illustrates an example of an NR frame structure according to an embodiment of the present disclosure.

In NR, a basic unit of a time domain may be $T_c=1/(\Delta f_{max}\cdot N_f)$. Here, $\Delta f_{max}=480\cdot10^3$ and $N_f=4096$. Also, $\kappa=T_s/T_c=64$ may be a constant about a multiple relationship between an NR time unit and an LTE time unit. In LTE, $T_s=1/(\Delta f_{ref}\cdot N_{f,\ ref})$, $\Delta f_{ref}=15\cdot10^3$ and $N_{f,ref}=2048$ may be defined as a reference time unit. The constants for the multiple relationship between the NR time base unit and the LTE time base unit may be defined as k=Ts/Tc=64.

Referring to FIG. 1, a time structure of a frame for a downlink/uplink (DL/UL) transmission may include $T_f=(\Delta f_{max}N_f/100)\cdot T_s=10$ ms. Here, a single frame may include 10 subframes corresponding to $T_{sf}=(\Delta f_{max}N_f/1000)\cdot T_s=1$ ms. A number of consecutive orthogonal frequency division multiplexing (OFDM) symbols per subframe may be $$N_{symb}^{subframe,\mu} = N_{symb}^{slot} N_{slot}^{subframe,\mu}.$$

Also, each frame may be divided into two half frames and the half frames may include 0~4 subframes and 5~9 subframes. Here, half frame 1 may include 0~4 subframes and half frame 2 may include 5~9 subframes.

$N_{TA}$ represent the timing advance (TA) between downlink (DL) and uplink (UL). Here, a transmission timing of uplink transmission frame i is determined based on a downlink reception timing at a UE according to the following Equation 1.

$$T_{TA}=(N_{TA}+N_{TA,offset})T_c \qquad \text{[Equation 1]}$$

$N_{TA,offset}$ denotes a TA offset value occurring due to a duplex mode difference and the like. Basically, in a frequency division duplex (FDD), $N_{TA,offset}=0$. In a time division duplex (TDD), $N_{TA,offset}$ may be defined as a fixed value by considering a margin for a DL-UL switching time. For example, in the TDD (Time Division Duplex) of RF1 (Frequency Range 1) which is a sub-6 GHz or less frequency, $N_{TA,offset}$ may be $39936T_C$ or $2600T_C$. $39936T_C=20.327$ μs and $25600T_C=13.030$ μs. Also, in FR2 (Frequency Range 2) which is millimeter wave (mmWave), $N_{TA,offset}$ may be $13792T_C$. At this time, $39936T_C=7.020$ μs.

Figure 2:
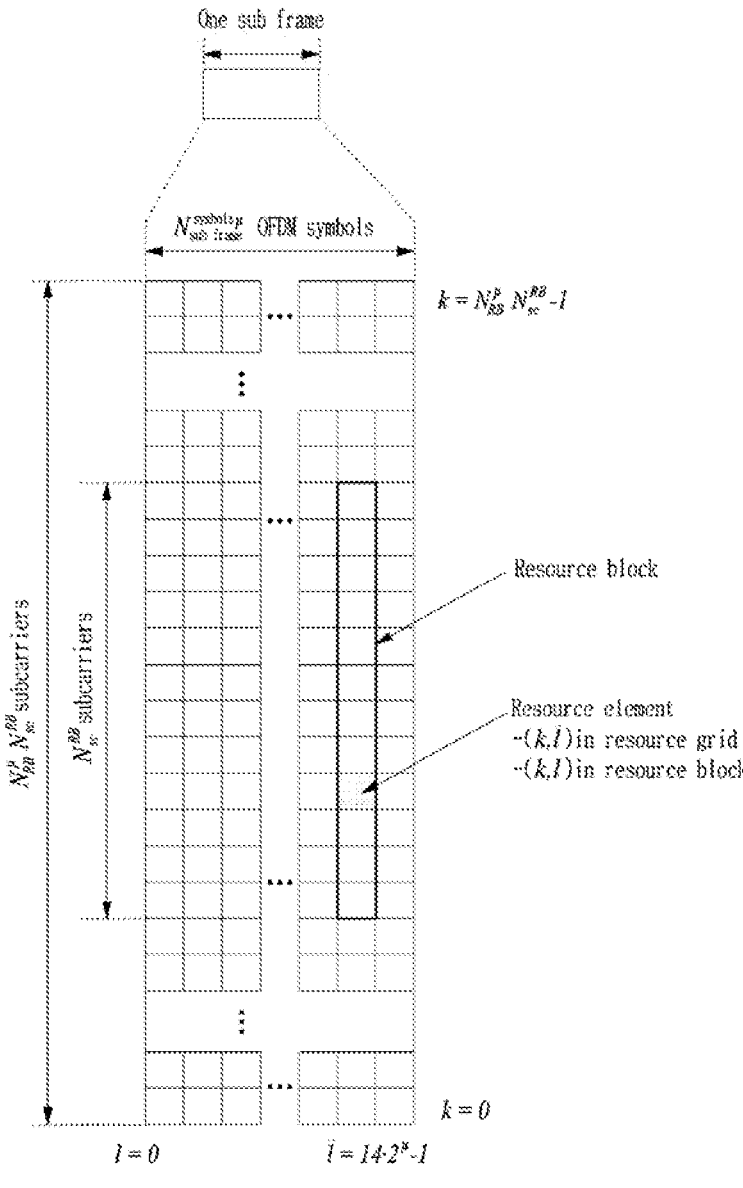
FIG. 2 illustrates an NR resource structure to which the present disclosure may apply.

FIG. 2 illustrates an NR resource structure to which the present disclosure can be applied.

A resource element within a resource grid may be indexed based on each subcarrier spacing. Here, a single resource grid may be generated for each antenna port and for each subcarrier spacing. Uplink/downlink transmission and reception may be performed based on a corresponding resource grid.

A resource block (RB) on a frequency domain is configured of 12 REs and for every 12 Res, an index for one RB ($n_{PRB}$) may be configured. The index for RB may be utilized within a specific frequency band or system bandwidth. The index for RB may be defined as shown in Equation 2 below. Here, $N^{RB}_{sc}$ represents the number of subcarriers per one RB and k represents subcarrier index.

$$n_{PRB}=\text{int}(k/N^{RB}_{sc}) \qquad \text{[Equation 2]}$$

Numerologies may be variously configured to meet various services and requirements of the NR system. For example, one subcarrier spacing (SCS) may be supported in the LTE/LTE-A system, but a plurality of SCS may be supported in the NR system.

A new numerology for the NR system that supports the plurality of SCSs may operate in frequency range or carrier, such as 3 GHz or less, 3 GHz-6 GHz, 6 GHZ-52.6 GHz, or 52.6 GHz or more, to solve an issue that a wide bandwidth is unavailable in frequency range or carrier such as 700 MHz or 2 GHz.

Table 1 below shows an example of the numerologies supported by the NR system.

TABLE 1

| u | $\Delta f = 2^u \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Referring to the above Table 1, the numerologies may be defined based on an SCS, a cyclic prefix (CP) length, and a number of OFDM symbols per slot, which are used in an OFDM system. The aforementioned values may be provided to a UE through upper layer parameters, DL-BWP-mu and DL-BWP-cp, for the downlink, and through upper layer parameter, UL-BWP-mu and UL-BWP-cp, for the uplink.

In above Table 1, if μ=2 and SCS=60 kHz, a normal CP and an extended CP may be applied. In other bands, only the normal CP may be applied.

Here, a normal slot may be defined as a basic time unit used to transmit a single piece of data and control information in the NR system. A length of the normal slot may basically include 14 OFDM symbols. Also, dissimilar to a slot, a subframe may have an absolute time length corresponding to 1 ms in the NR system and may be used as a reference time for a length of another time section. Here, for coexistence and backward compatibility of the LTE and the NR system, a time section, such as an LTE subframe, may be required for an NR standard.

For example, in the LTE, data may be transmitted based on a transmission time interval (TTI) that is a unit time. The TTI may include at least one subframe unit. Here, even in the LTE, a single subframe may be set to 1 ms and may include 14 OFDM symbols (or 12 OFDM symbols).

Also, in the NR system, a non-slot may be defined. The non-slot may refer to a slot having a number of symbols less by at least one symbol than that of the normal slot. For example, in the case of providing a low latency such as an Ultra-Reliable and Low Latency Communications (URLLC) service, a latency may decrease through the non-slot having the number of slots less than that of the normal slot. Here, the number of OFDM symbols included in the non-slot may be determined based on a frequency range. For example, a non-slot with 1 OFDM symbol length may be considered in the frequency range of 6 GHz or more. As another example, a number of symbols used to define the non-slot may include at least two OFDM symbols. Here, the range of the number of OFDM symbols included in the non-slot may be configured with a length of a mini slot up to (normal slot length)−1. Here, although the number of OFDM symbols may be limited to 2, 4, or 7 as a non-slot standard, it is provided as an example only.

Also, for example, an SCS corresponding to μ=1 and 2 may be used in the unlicensed band of 6 GHz or less and an SCS corresponding to μ=3 and 4 may be used in the unlicensed band above 6 GHz. Here, for example, if μ=4, it may be used for a synchronization signal block (SSB).

TABLE 2

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows a number of OFDM symbols per slot (Nslotsymb), a number of slots per frame (Nframe,uslot), and a number of slots per subframe (Nsubframe,uslot) for the normal CP by subcarrier spacing setting. In Table 2, the values are based on the normal slot having 14 OFDM symbols.

TABLE 3

| u | $N^{slot}_{symb}$ | $N^{frame, u}_{slot}$ | $N^{subframe, u}_{slot}$ |
|---|---|---|---|
| 2 | 12 | 40 | 4 |

In Table 3, in the case of the extended CP applied (that is, μ=2 and SCS=60 kHz), shows the number of slots per frame and the number of slots per subframe based on the normal slot of which the number of OFDM symbols per slot is 12.

As described above, a single subframe may correspond to 1 ms on a time axis. Also, a single slot may correspond to 14 symbols on the time axis. For example, a single slot may correspond to 7 symbols on the time axis. Therefore, the number of slots and the number of symbols that may be considered may be differently set within 10 ms corresponding to a single radio frame. Table 4 may show the number of slots and the number of symbols according to each SCS. Although SCS of 480 kHz may not be considered in Table 4, the present disclosure is not limited to such examples.

TABLE 4

| SCS | Number of slots in 10 ms (14 symbols in 1 slot) | Number of slots in 10 ms (7 symbols in 1 slot) | Number of symbols in 10 ms |
|---|---|---|---|
| 15 kHz | 10 | 20 | 140 |
| 30 kHz | 20 | 40 | 280 |
| 60 kHz | 40 | 80 | 560 |
| 120 kHz | 80 | N/A | 1120 |
| 240 kHz | 160 | N/A | 2240 |
| 480 kHz | 320 | N/A | 4480 |

Positioning technology to which the present disclosure applies is additionally enhanced using LTE-based NR technology. In the case of commercial use, technologies for satisfying an error up to 3 m for indoor use and an error up to 10 m for outdoor use with respect to 80% of users within coverage are included. To this end, the following various technologies are being considered, such as time-of-arrival-based technology and angle-of-departure/arrival-based technology with respect to downlink and/or uplink.

As a downlink-based method, time-based technology includes a DL-time difference of arrival (TDOA) method and angle-based technology includes a DL-angle of departure (AoD) method. For example, in the case of estimating a location of a UE based on the DL-TDOA method, it is possible to compute a difference in time of arrival of signals transmitted at different transmission points and to estimate the location of the UE through location information of each transmission point. Also, for example, in the case of estimating the location of the UE based on the DL-AoD method, it is possible to estimate the location of the UE by verifying an angle of departure of a signal transmitted to the UE and by verifying a direction in which the signal is transmitted based on a location of a transmission point.

Also, as an uplink-based method, time-based technology includes an UL-TDOA method and angle-based technology includes a DL-angle of arrival (AoA) method. For example, in the case of estimating a location of a UE based on the UL-TDOA method, it is possible to compute a difference in time at which a signal transmitted from the UE arrives at each transmission point and to estimate the location of the UE through an arrival time difference value and location information of each transmission point. Also, for example, in the case of estimating a location of the UE based on the DL-AoA method, it is possible to estimate the location of the UE by verifying an AoA of a signal transmitted from the UE and by verifying a direction in which the signal is transmitted based on a location of a transmission point.

Also, downlink and uplink-based methods include a multi-cell Round-Trip Time (RTT) method, an RTT method between one or more adjacent gNodeBs and/or Transmission Reception Points (TRPs) for NR uplink and downlink positioning. For example, in the case of estimating a location of the UE using the multi-cell RTT method, it is possible to measure a time (i.e., RTT) in which signals are transmitted and responses are received in a plurality of cells and to estimate the location of the UE through location information of the plurality of cells. Also, location estimation of the UE may be performed by verifying RTT signals in gNodeBs and/or TRPs. Also, in the case of estimating a location of the UE based on E-CID, location estimation of the UE may be performed by measuring AoA and received strength and by identifying each cell ID.

To realize the aforementioned technologies, an LTE DL-based positioning reference signal (PRS) is newly discussed as "DL PRS" modified according to an NR downlink structure. Additionally, for uplink, it is being developed to "sounding reference signal (SRS) for positioning" that is a reference signal enhanced from an SRS that is an NR-based uplink reference signal considering multiple input multiple output (MIMO), in consideration of even positioning.

Also, to provide an enhanced solution in relation to a positioning operation, requirements for high accuracy, low latency, network efficiency (e.g., scalability, RS overhead, etc.), and device efficiency (e.g., power consumption, complexity, etc.) for horizontal or vertical positioning are being additionally considered.

For example, the positioning operation may consider requirements to have high accuracy in consideration of an IIoT scenario. To this end, a DL/UL positioning reference signal, signaling/procedure for improving accuracy, reduced latency, and methods of improving network efficiency and device efficiency may be considered.

Therefore, in commercial use cases, such as IoT devices for smart home or being wearable and IIoT use cases, such as IoT devices in a smart factory, an operation of enhancing performance of NR-based positioning technologies is being applied for higher accuracy, low latency, and network/device efficiency.

In this regard, the goal is to increase accuracy with an error of up to 1 m in the commercial use cases and an error of up to 0.2 m in the IIoT use cases, and to further decrease a latency time from within the existing 100 ms to less than 10 ms.

Here, the following Table 5 may show the IIoT scenario that considers devices for smart factor indoors (indoor factory devices).

In detail, the IIoT scenario may consider a case in which clusters are dense and a case in which clusters are sparse in an internal environment. That is, it may be distinguished according to the number of clusters present in the internal environment. Also, the IIoT scenario may consider a case in which an antenna height is higher than an average cluster height and a case in which the antenna height is lower than the average cluster height. That is, the IIoT scenario may be represented as in the following Table 5 in consideration of the above cases.

That is, inF-SL refers to a scenario with sparse clutter in an indoor factory environment, such as a smart factory, and all of transmit (Tx) and receive (Rx) antennas of the base station are lower than the average antenna height of the clusters. Also, inF-DL refers to a scenario with dense clutter in an indoor factory environment, such as a smart factory, and all of Tx and Rx antennas of the base station are lower than the average antenna height of the clusters.

Meanwhile, InF-SH refers to a scenario that considers a case with sparse clutter in an indoor factory environment, such as a smart factory, and Tx or Rx antennas of the base station are higher than the average antenna height of the clusters. Also, InF-DH refers to a scenario that considers a case with dense clutter in an indoor factory environment, such as a smart factory, and Tx or Rx antennas of the base station are higher than the average antenna height of the clusters.

Additionally, InF-HH refers to a scenario that considers a case in which all of Tx and Rx antennas of the base station are higher than an average antenna height of clusters regardless of cluster density in an indoor factory environment, such as a smart factory.

Here, a cluster represents a form in which base stations are intensively arranged at regular intervals in a certain space. For example, a cluster may be implemented using 18 base stations as in Table 6. However, it is provided as an example only and the present disclosure is not limited thereto.

Also, as described above, cluster density and antenna height between a base station and a cluster may be considered in a scenario since characteristics or interference of radio waves varies and positioning technology for satisfying various performance requirements (accuracy, latency, network/device efficiency) required for positioning slightly varies.

However, in an actual application, common positioning technology capable of covering all requirements in the above five scenarios may be applied and, the following positioning technology to be described herein may also be applied to all of the five scenarios. That is, in an indoor factory environment, such as a smart factory, positioning may be performed by applying positioning technology to be applied herein to all of IIoT devices that operate based on NR.

TABLE 5

InF-SL : Indoor Factory with Sparse clutter and Low base station height (both Tx and Rx are below the average height of the clutter)
InF-DL : Indoor Factory with Dense clutter and Low base station height (both Tx and Rx are below the average height of the clutter)

TABLE 5-continued

InF-SH : Indoor Factory with Sparse clutter and High base station height (Tx or Rx elevated above the clutter)
InF-DH : Indoor Factory with Dense clutter and High base station height (Tx or Rx elevated above the clutter)
- InF-HH : Indoor Factory with High Tx and High Rx (both elevated above the clutter)

TABLE 6

| Layout | Hall size | InF-SH:<br>(baseline) 300 × 150 m<br>(optional) 120 × 60 m<br>InF-DH:<br>(baseline) 120 × 60 m<br>(optional) 300 × 150 m |
| | BS locations | 18 BSs on a square lattice with spacing D, located D/2 from the walls.<br>for the small hall (L = 120 m × W = 60 m):<br>D = 20 m<br>for the big hall (L = 300 m × W = 150 m):<br>D = 50 m |
| | Room height | 10 m |

Hereinafter, a method of generating a PRS based on positioning requirements required in consideration of the aforementioned IIoT scenario and a new application is described.

Figure 3:
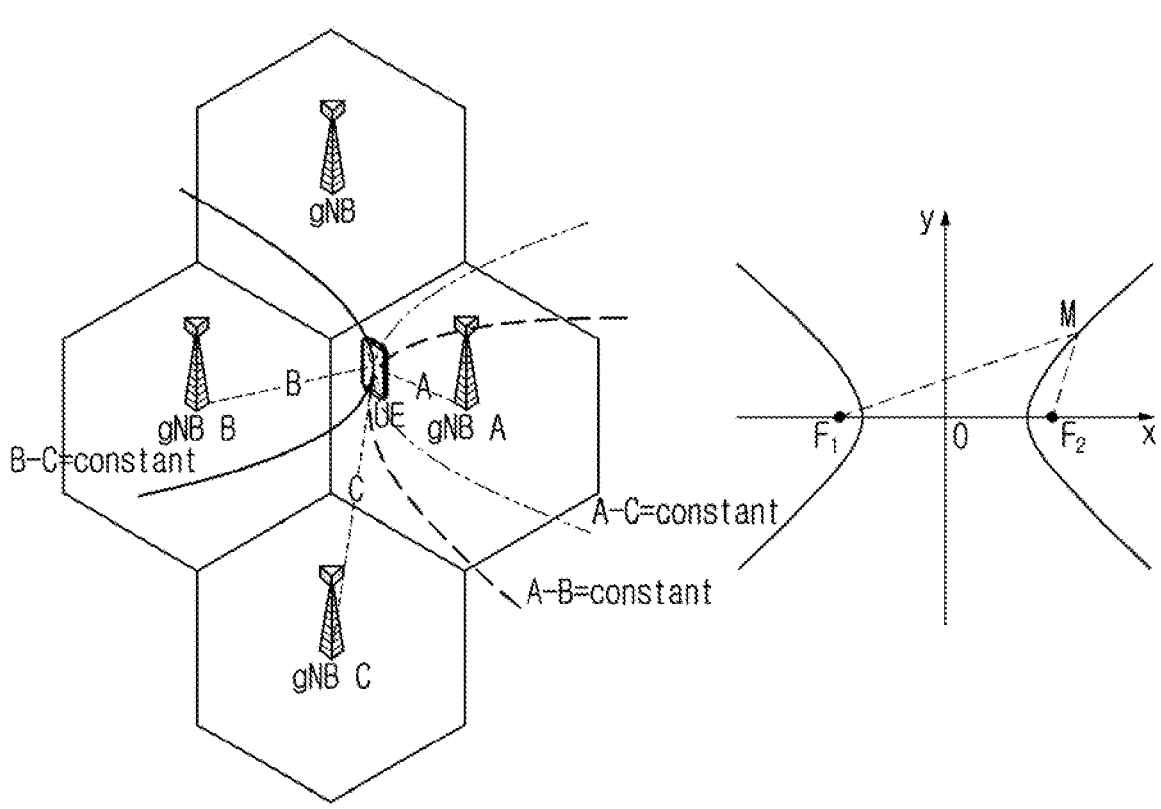
FIG. 3 illustrates a method of performing positioning based on observed time difference of arrival (OTDOA) to which the present disclosure may apply.

FIG. 3 illustrates a method of performing positioning based on observed time difference of arrival (OTDOA) to which the present disclosure may apply.

The OTDOA may be a method of measuring a location by tracking a signal transmitted to a ground station through a communication satellite in LTE and/or NR system. That is, the OTDOA is based on measuring a difference in time of arrival between wireless signals transmitted at various locations. For example, a plurality of cells may transmit reference signals (RSs) and a UE may receive the same. Due to a difference in a distance between each of the plurality of cells and Table 1 location of the UE, a time of arrival in which a reference signal transmitted from each of the plurality of cells is received at the UE may differ. Here, the UE may compute a time difference for a signal received from each cell and may transmit computed information to a network. The network may combine the time difference with antenna location information of each cell to compute the location of the UE. Here, at least three cells may be used to measure the location of the UE.

Also, for example, a difference in a point in time at which the UE receives a reference signal from each of a single pair of base stations (gNodeBs/eNodeBs) is defined as a Reference Signal Time Difference (RSTD). Here, positioning by the RSTD may be performed based on a downlink signal. The UE may estimate a location based on TDOA measurement of special reference signals received from other base stations (gNodeBs/eNodeBs).

Figure 4:
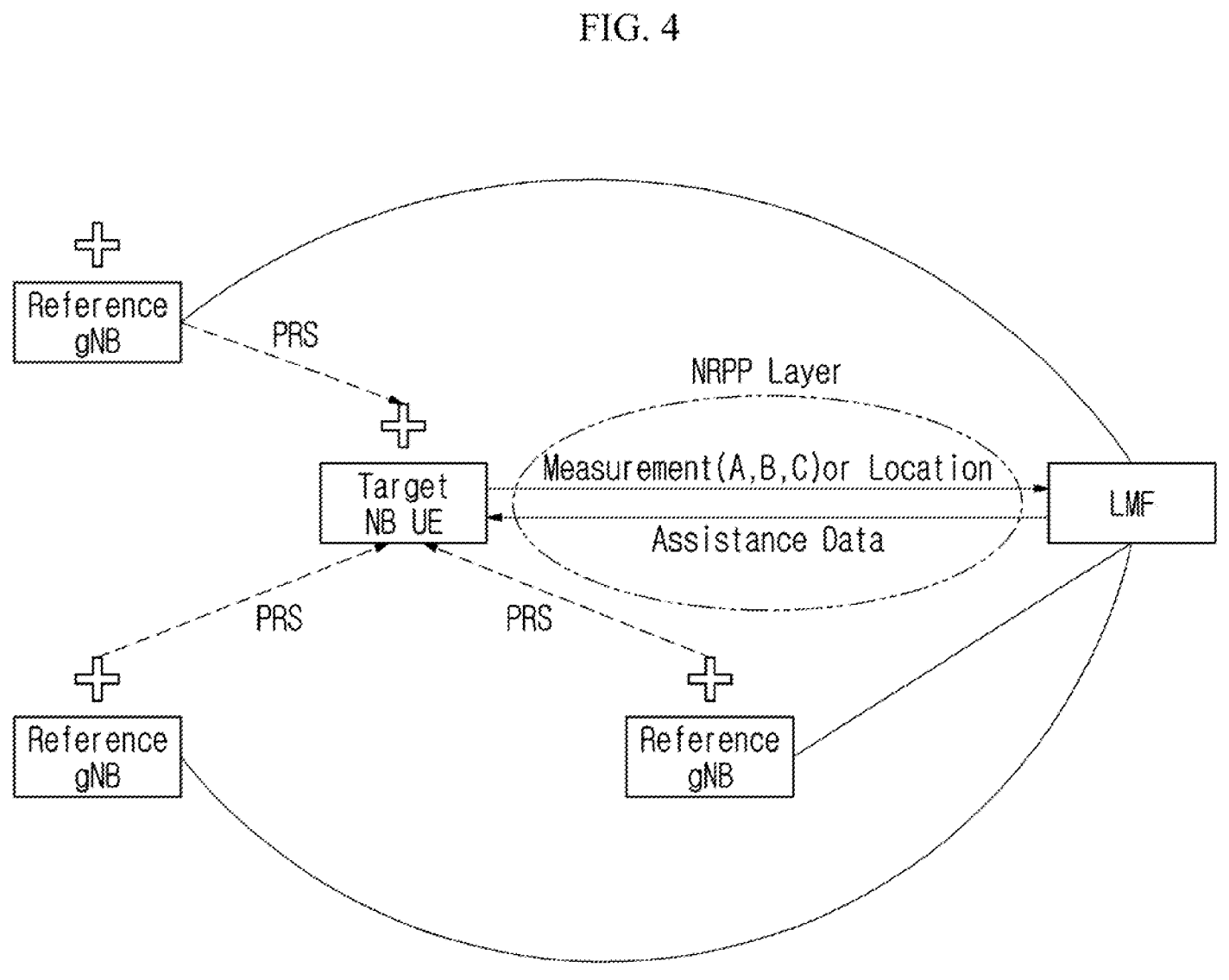

FIG. 4 illustrates a configuration of a control plane and a user plane for an NR positioning protocol (NRPP) related to the present invention to which the present disclosure may apply. For example, positioning technology may be defined as at least one of an enhanced cell ID (E-CID), an observed time difference of arrival (OTDOA), and a global navigation satellite system (A-GNSS). Here, the aforementioned positioning technology may simultaneously support positioning solutions of control plane and user plane. An LTE and/or NR network-based positioning function may be controlled under control of a location management function (LMF). Here, control plane positioning and user plane positioning may be performed through the LMF. The LMF may be controlled by a network end and may interact with the base station through a mobility entity (e.g., access and mobility management function (AMF)).

As another example, the LTE and/or NR network-based positioning function may be controlled by Evolved-Serving Mobile Location Centre (E-SMLC)/Secure User Plane Location (SUPL) Location Platform (SLP)) based on an LTE positioning protocol (LPP). Here, positioning may be performed on the control plane through the E-SMLC and positioning may be performed on the user plane through the SLP. Each may be controlled at the network end and may interwork with the base station through a mobility entity (e.g., Mobility Management Entity (MME)).

For example, in the LTE system, positioning is performed through DL-based location estimation based on a time difference or positioning is performed through location estimation based on a cell ID. In the NR system, positioning may perform a positioning operation in consideration of DL-based location estimation (e.g., PRS) and UL-based location estimation (e.g., SRS for positioning). Also, the positioning may perform the positioning operation based on a signal exchange time for a plurality of cells in round trip time (RTT) or may perform the positioning operation based on a cell ID. Also, the positioning may perform the positioning operation based on a signal reception time difference. Also, in a new communication system, the positioning may perform the positioning operation based on an angle difference for each beam since beam-based communication is performed. A downlink/uplink reference signal and an operation of UE/base station (e.g., gNB) based on the aforementioned description may be expressed as in the following Table 7 and Table 8.

TABLE 7

| DL/UL Reference Signals | UE Measurements | To facilitate support of the following positioning techniques |
|---|---|---|
| Release-16 DL PRS | DL RSTD | DL-TDOA |
| Release-16 DL PRS | DL PRS RSRP | DL-TDOA, DL-AoD, Multi-RTT |
| Release-16 DL PRS/Release-16 SRS for positioning | UE Rx-Tx time difference | Multi-RTT |
| Release-15 SSB/CSI-RS for RRM | SS-RSRP(RSRP for RRM), SS-RSRQ(for RRM), CSI-RSRP (for RRM), CSI-RSRQ(for RRM), SS-RSRPB(for RRM) | E-CID |

TABLE 8

| DL/UL Reference Signals | gNB Measurements | To facilitate support of the following positioning techniques |
|---|---|---|
| Release-16 SRS for positioning | UL RTOA | UL-TDOA |
| Release-16 SRS for positioning | UL SRS-RSRP | UL-TDOA, UL-AoA, Multi-RTT |

TABLE 8-continued

| DL/UL Reference Signals | gNB Measurements | To facilitate support of the following positioning techniques |
|---|---|---|
| Release-16 SRS for positioning, Release-16 DL PRS | gNB Rx-Tx time difference | Multi-RTT |
| Release-16 SRS for positioning, | AoA and ZoA | UL-AoA, Multi-RTT |

Here, the terms of Table 7 and Table 8 may be given as follows:

RSTD (Reference Signal Time Difference)

RSRP (Reference Signal Received Power)

RTOA (Relative Time Of Arrival)

RSRQ (Reference Signal Received Quality)

RSRPB (Reference Signal Received Power per Branch)

RRM (Radio Resource Management)

CSI-RS (Channel State Information Reference Signal)

Here, the RSTD may represent a transmission time difference of a reference signal and the RTOA may represent a relative time value at which a signal arrives. Positioning may be performed based on location information of a transmission point by computing a relative time difference value based on a location of a transmission point at which a reference signal is transmitted and a transmission time difference. Also, the RSRP represents power of a received reference signal and the RSRPB represents power of a reference signal measured per branch. The RSRQ represents quality of a received reference signal. Whether the positioning operation is possible may be verified by verifying power and quality of a received reference signal through the RSRP and the RSRQ. Also, the RRM may perform resource management and may verify resources for positioning.

Therefore, in a new communication system, positioning may be performed based on at least one of downlink/uplink, time difference/angle difference, RTT, and cell ID. Here, referring to downlink (DL) PRS for the positioning, a DL PRS resource set may be configured in a single base station (or a transmission reception point (TRP)). Here, the DL PRS resource set may be a set of DL PRS resources. Each DL PRS resource within the DL PRS resource set may have each corresponding DL PRS resource ID. For example, in the new communication system (e.g., NR), each base station (or TRP) may perform communication using a plurality of beams. Here, each DL PRS resource ID may correspond to each corresponding beam transmitted from a single base station (or TRP). That is, DL PRS resources within the DL PRS resource set may corresponding to beams, respectively.

Here, DL PRS configuration may include a DL PRS transmission schedule. Through this, the base station (or TRP) may indicate the DL PRS configuration to the UE. Therefore, the UE may verify a DL PRS based on the indicated DL PRS configuration without performing blind detection. Numerologies for a DL PRS may be the same as numerologies for data transmission. For example, a CP length and a subcarrier spacing (SCS) for the DL PRS may be the same as those for the data transmission.

Also, in one or more base stations (or TRPs), DL PRS resource sets may be transmitted through a positioning frequency layer. Here, since the DL PRS resource sets are transmitted through the same positioning frequency layer, an SCS, a CP type, a center frequency, point A, a bandwidth, a start physical resource block (PRB), and a comb size may be configured to be the same. Here, the point A may be a value that indicates a location of resource block (RB) 0. The DL PRS resource sets may be transmitted through the same frequency layer. Here, a DL PRS sequence may be a binary sequence as a gold sequence, which may be the same as a DL PRS of the existing system. The DL PRS sequence ID may be 4096, which may be greater than a sequence (1024) for a cell ID in NR. Also, the DL PRS may be modulated based on Quadrature Phase Shift Keying (QPSK) and may be transmitted based on a Cyclic-Prefix Orthogonal Frequency Division Multiplexing (CP-OFDM) method. Also, as a time axis resource for DL PRS, 12 symbols may be configured within a single slot and a comb size of up to Comb-12 may be supported.

More details may be shown in the following Table 9. That is, PRSs may be allocated at different intervals on a frequency axis based on the comb size. In the LTE system, DL PRSs may be transmitted using all symbols within a single slot. However, in the NR system that is a new communication system, DL PRSs may be transmitted based on the different number of symbols as shown in the following Table 9.

according to the RE offset $\{0,1\}$ and the frequency axis may be allocated based on comb size 2. A case in which DL PRSs are allocated to four symbols (0,1,2,3) for comb size=4 (Comb-4) may be considered. Here, the RE offset may be $\{0,2,1,3\}$. That is, the DL PRSs may be allocated to the first to fourth symbols according to the RE offset $\{0, 2, 1, 3\}$ and the frequency axis may be allocated based on comb size 4. A case in which DL PRSs are allocated to four symbols (0,1,2,3,4,5) for comb size=6 (Comb-6) may be considered. Here, the RE offset may be $\{0,3,1,4,2,5\}$. That is, the DL PRSs may be allocated to the first to sixth symbols according to the RE offset $\{0,3,1,4,2,5\}$ and the frequency axis may be allocated based on comb size 6.

The present disclosure may support DL PRS muting. When a DL PRS to be muted is indicated to the UE, the UE may mute the corresponding DL PRS. Here, a DL PRS muting bitmap for a DL PRS resource set may be configured and based thereon, the DL PRS to be muted may be indicated to the UE. Here, each bit of the DL PRS muting bitmap (hereinafter, option 1 bitmap) may correspond to each occasion or consecutive instances within the DL PRS resource set. Here, when a specific bit indicates muting, all

TABLE 9

|  | 2 symbols | 4 symbols | 6 symbols | 12 symbols |
|---|---|---|---|---|
| Comb-2 | $\{0, 1\}$ | $\{0, 1, 0, 1\}$ | $\{0, 1, 0, 1, 0, 1\}$ | $\{0, 1, 0, 1, 0, 1, 0, 1, 0, 1, 0, 1\}$ |
| Comb-4 | NA | $\{0, 2, 1, 3\}$ | NA | $\{0, 2, 1, 3, 0, 2, 1, 3, 0, 2, 1, 3\}\}$ |
| Comb-6 | NA | NA | $\{0, 3, 1, 4, 2, 5\}$ | $\{0, 3, 1, 4, 2, 5, 0, 3, 1, 4, 2, 5\}$ |
| Comb-12 | NA | NA | NA | $\{0, 6, 3, 9, 1, 7, 4, 10, 2, 8, 5, 11\}$ |

A DL PRS transmission period may be configured for each DL PRS resource set. For example, each base station (or TRP) may configure a plurality of DL PRS resource sets. A plurality of DL PRS resource sets having different periods may be present in the same base station (or TRP). The period may be variously configured.

Resources allocated for transmission of DL PRS (hereinafter, DL PRS resources) may be repeated 1, 2, 4, 6, 8, 16, or 32 times. An interval between the respective repeated DL PRS resources may be set to one of 1, 2, 4, 8, 16, and 32 slots. However, the present disclosure is not limited to the aforementioned example.

Regarding frequency allocation for the DL PRS resources, granularity of a DL PRS bandwidth may be 4 PRBs. A start PRB may be indicated to the UE using a parameter and the UE may determine the start PRB based on the indicated parameter. For example, a minimum bandwidth for DL PRS may be 24 PRBs and a maximum bandwidth may be 272 PRBs.

Regarding the DL PRS, a resource element (RE) offset may be configured on the frequency axis. Here, the RE offset may be configured to have a certain offset on the frequency axis based on a comb pattern based on a first symbol of DL PRS resource. The first symbol may be configured in the UE. Remaining symbols may be determined based on the RE offset based on the first symbol.

Figure 5:
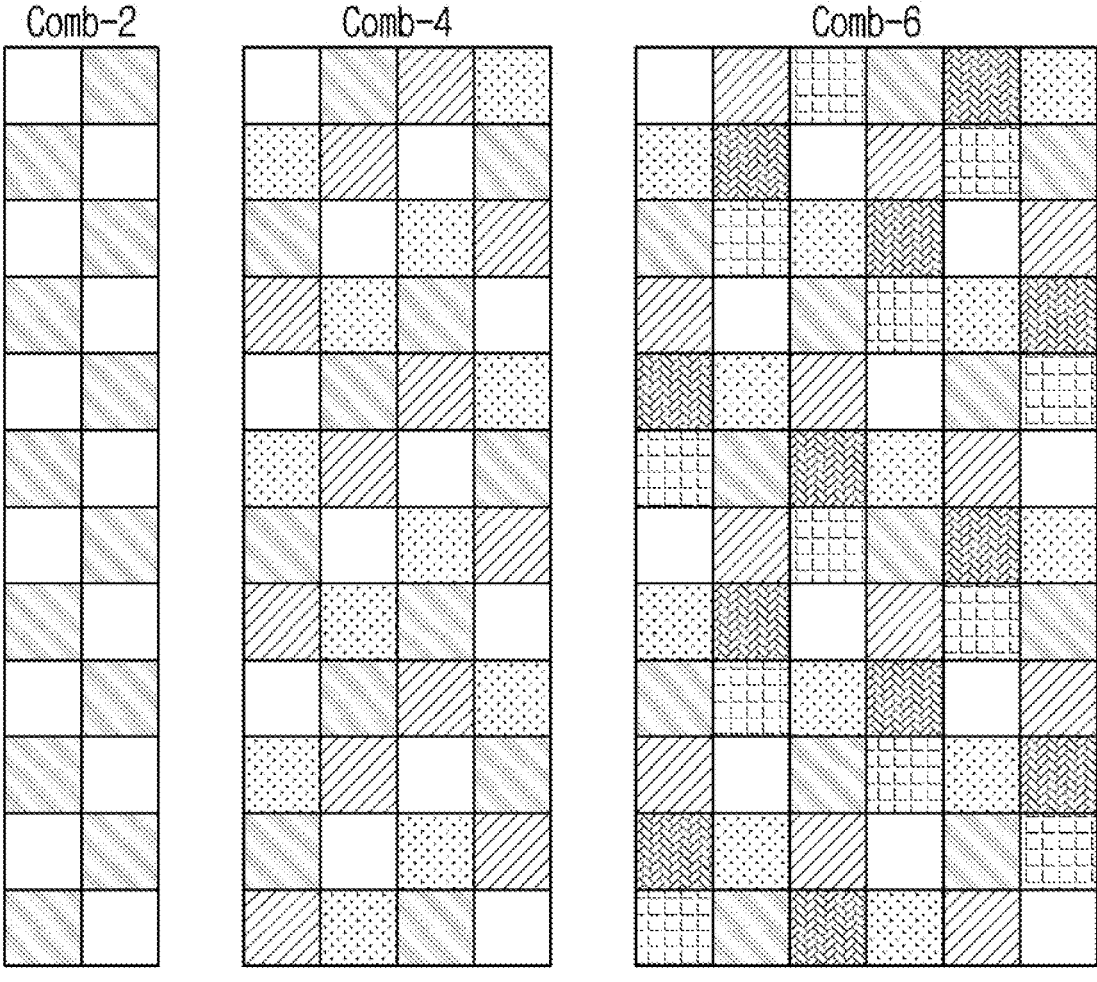
FIG. 5 illustrates a comb pattern applicable to the present disclosure.

FIG. 5 illustrates a comb pattern applicable to the present disclosure.

A DL PRS RE pattern in a case in which a comb size and the number of symbols are the same is described with reference to FIG. 5.

In detail, a case in which DL PRSs are allocated to two symbols (0,1) for comb size=2 (Comb-2) may be considered. Here, an RE offset may be $\{0,1\}$. That is, the DL PRSs may be allocated to a first symbol and a second symbol the DL PRSs within occasion or consecutive instances corresponding to the specific bit may be muted.

Also, a bitmap indicating muting (hereinafter, option 2 bitmap) may indicate muting for each DL PRS resource within an occasion or an instance for a single period. Each bit of the bitmap may correspond to a repetition index of each DL PRS resource within the occasion or instances for a single period. That is, each bit may correspond to a single repetition of DL PRS within each single DL PRS period and muting may be indicated by each bit. For example, the bitmap may be configured using one of 2, 4, 8, 16, or 32 bits.

Regarding the above muting option, at least one of the option 1 bitmap and the option 2 bitmap may be configured. For example, only the option 1 bitmap may be configured. Also, for example, only the option 2 bitmap may be configured. Also, for example, all of the option 1 bitmap and the option 2 bitmap may be configured. Here, when all of the option 1 bitmap and the option 2 bitmap are configured, all the DL PRS resources within an occasion indicated for muting based on the option 1 bitmap be muted and a DL PRS resource indicated for muting by the option 2 bitmap in an occasion not indicated for muting by the option 1 bitmap may be muted.

In a new communication system (e.g., NR), a DL PRS may be generated and positioning may be performed. Here, referring to the above Table 9, 12 resources may be fully orthogonal within a single slot. Here, when DL PRSs are allocated to two symbols as a case of combo size=2 (comb-2), two resources may be orthogonal and six resources may be additionally distinguished based on symbol offset. Also, when DL PRSs are allocated to four symbols as a case of combo size=4 (comb-4), four resources may be orthogonal and three resources may be additionally distinguished based on symbol offset. Also, when DL PRSs are allocated to six symbols as a case of combo size=6 (comb-6), six resources may be orthogonal and two resources may be additionally distinguished based on symbol offset. Also, when DL PRSs are allocated to 12 symbols as a case of combo size=12 (comb-12), 12 resources may be orthogonal and only a single resource may be distinguished based on symbol offset.

Regarding the DL PRS, in the new communication system, up to 64 TRPs may be supported in a single frequency layer and 64 resources may be allocated for each TRP. Considering this, a DL PRS ID may be 4096 (=64*64).

For example, as a case in which the UE operates based on an IIoT scenario in the band of 120 kHz, 18 TRPs may be supported in consideration of scenarios shown in the above Table 5 and Table 6. Here, each of 64 resources may be supported for DL PRS by considering that 64 beams are supported per TRP. Therefore, the total number of resources required may be 1152 (=18*64). Here, fully orthogonal resources within a single slot are 12 symbols, 96 (1152/12=96) slots may be required in consideration of 1152 resources. Here, the 96 slots may correspond to 12 ms in 120 kHz.

Meanwhile, as described above, positioning related latency requirements may be set to 10 ms or less. Therefore, if 96 slots corresponding to 12 ms are used, requirements (10 ms) for latency may be satisfied. That is, a method of efficiently allocating DL PRS resources may be required.

FIGS. 6 and 7 illustrate a method of performing cyclic prefix based on a DL PRS allocation pattern applicable to the present disclosure. Orthogonality of a DL PRS allocation pattern may be broken due to a collision when both a frequency axis cyclic prefix and a time axis cyclic prefix are performed. Therefore, in the case of performing a cyclic prefix based on the DL PRS allocation pattern, only the frequency axis cyclic prefix may be possible.

Referring to FIG. 6, in the case of {0, 3, 1, 4, 2, 5} allocated as a pattern in which DL PRSs are allocated to 6 symbols with combo size=6, 6 patterns may be possible with the frequency axis cyclic prefix. FIG. 6 may be a resource allocation method in the case of f=0 and f=2.

Referring to FIG. 7, in the case of {0, 6, 3, 9, 1, 7, 4, 10, 2, 8, 5, 11} allocated as a pattern in which DL PRSs are allocated to 12 symbols with combo size=12, 12 patterns may be possible with frequency axis cyclic prefix. FIG. 7 may be a resource allocation method in the case of f=0 and f=2.

FIG. 8 illustrates a DL PRS resource allocation method applicable to the present disclosure.

In a communication system according to the present disclosure, DL PRS muting may be supported. If a DL PRS to be muted is indicated to the UE, the UE may mute the corresponding DL PRS. Here, a DL PRS muting bitmap for a DL PRS resource set may be configured and, based thereon, the DL PRS to be muted may be indicated to the UE. Here, each bit of the DL PRS muting bitmap (hereinafter, option 1 bitmap) may correspond to each occasion or consecutive instances within the DL PRS resource set. Here, each DL PRS occasion may correspond to the entire DL PRS resources (including repetitive transmission) within each DL PRS period. That is, a single DL PRS occasion may correspond to a single DL PRS period.

Here, when a specific bit indicates muting, all the DL PRSs within an occasion or consecutive instances corresponding to the specific bit may be muted. For example, as described above, even a DL PRS of the existing system (LTE) may be muted based on an occasion. As another example, a bitmap indicating muting (hereinafter, option 2 bitmap) may indicate muting for each DL PRS resource within an occasion or an instance for a single period. Here, each bit of the bitmap may correspond to a repetition index of each DL PRS resource within the occasion or instances for a single period (i.e., each bit corresponds to a single repetition of DL PRS within each single DL PRS period) and muting may be indicated by each bit. Here, the bitmap may be configured using one of 2, 4, 8, 16, or 32 bits.

For example, regarding the muting option, at least one of the option 1 bitmap and the option 2 bitmap may be configured. For example, only the option 1 bitmap may be configured. Also, only the option 2 bitmap may be configured. For example, all of the option 1 bitmap and the option 2 bitmap may be configured. Here, when all of the option 1 bitmap and the option 2 bitmap are configured, all the DL PRS resources within an occasion indicated for muting based on the option 1 bitmap may be muted and a resource indicated for muting by the option 2 bitmap in an occasion not indicated for muting by the option 1 bitmap may be muted.

Referring to (a) of FIG. 8, the UE may verify a DL PRS period and offset indicated based on DL PRS configuration. In (a) of FIG. 8, the period is configured as 10 slots and offset is configured as 2 slots. However, it is provided as an example only and the present disclosure is not limited to the aforementioned example. Also, the UE may verify a repetitive pattern of DL PRS resources within the period through DL-PRS-ResourceRepetitionFactor" indicated based on the DL PRS configuration. Also, although it is configured such that "DL-PRS-ResourceRepetitionFactor" indicates 2 repetitions, it is provided as an example only and the present disclosure is not limited to the aforementioned example. The UE may verify a time interval between DL PRS resources within a single period through "DL-PRS-ResourceTimeGap" indicated based on DL PRS configuration. For example, although "DL-PRS-ResourceTimeGap" is configured as a single slot, it is provided as an example only and the present disclosure is not limited to the aforementioned example.

Referring to (b) of FIG. 8, the UE may perform muting based on the option 1 bitmap. For example, the option 1 bitmap may include 2 bits and may be a muting bitmap for 2 periods and each bit may correspond to a single occasion corresponding to a single period. Here, the UE may perform muting on a corresponding occasion based on each bit. Also, for example, the option 2 bitmap may include 2 bits and repetition of each DL PRS within a single period may correspond to each bit.

When muting is indicated to the UE based on the option 1 bitmap, the UE may recognize that all the DL PRSs of a corresponding occasion are muted and may perform positioning. On the contrary, in the case of the option 2 bitmap, a DL PRS indicated for muting through the option 2 bitmap in an occasion not indicated for muting to the UE based on the option 1 bitmap may be muted. That is, the UE may perform positioning with respect to only a DL PRS resources indicated to not be muted based on all of the option 1 bitmap and the option 2 bitmap among DL PRS resources. As a detailed example, in (b) of FIG. 8, DL PRS occasions 810-1, 810-2, 810-3, and 810-4 may correspond to PRS periods, respectively. Here, the first DL PRS occasion 810-1 may correspond to "period #0," the second DL PRS occasion 810-2 may correspond to "period #1," the third DL PRS occasion 810-3 may correspond to "period #2," and the fourth DL PRS occasion 810-4 may correspond to "period #3."

Since each bit of the option 1 bitmap corresponds to a DL PRS occasion, the option 1 bitmap may include 2 bits. Here, when a bit corresponding to the first DL PRS occasion 810-1 in the 2-bit option 1 bitmap corresponding to the first DL PRS occasion 810-1 and the second DL PRS occasion 810-2 indicates muting, all the DL PRS resources 820-1 and 820-2 within the first DL PRS occasion 810-1 are muted. Also, when a bit corresponding to the second DL PRS occasion 810-2 in the 2-bit option 1 bitmap indicates muting indicates muting, all of the DL PRS resources 820-3 and 820-4 within the second DL PRS occasion 810-2 are muted.

Meanwhile, when a bit corresponding to the third DL PRS occasion 810-3 in the 2-bit option 1 bitmap corresponding to the third DL PRS occasion 810-3 and the fourth DL PRS occasion 810-4 indicates muting, all of the DL PRS resources 820-5 and 820-6 within the third DL PRS occasion 810-3 are muted. Also, when a bit corresponding to the fourth DL PRS occasion 810-4 in the 2-bit option 1 bitmap indicates muting, all the DL PRS resources 820-7 and 820-8 within the fourth DL PRS occasion 810-4 are muted.

Also, repetitions of DL PRS resources may be included in each of the DL PRS occasions 810-1, 810-2, 810-3, and 810-4. For example, the first DL PRS occasion 810-1 includes two repetitions (820-1 and 820-2) of the DL PRS resource. The second DL PRS occasion 810-2 also includes two repetitions (820-3 and 820-4) of the DL PRS resource. The third DL PRS occasion 810-3 also includes two repetitions (820-5 and 820-6) of the DL PRS resource and the fourth DL PRS occasion 810-4 also includes two repetitions (820-7 and 820-8) of the DL PRS resource.

Here, each bit of the option 2 bitmap may correspond to repetition of each DL PRS resource. Therefore, within the first DL PRS occasion 810-1, the option 2 bitmap is set to 2 bits by two repetitions (820-1 and 820-2) of the DL PRS resource.

Here, when the option 1 bitmap indicates that the first DL PRS occasion 810-1 is to be muted, two repetitions (820-1 and 820-2) of the DL PRS resource are muted regardless of the option 2 bitmap. On the contrary, when the option 1 bitmap indicates that the first DL PRS occasion 810-1 is not to be muted, muting of two repetitions (820-1 and 820-2) of the DL PRS resource is indicated by the option 2 bitmap. Here, when a bit corresponding to the first repetition 820-1 of the DL PRS resource in the 2-bit option 2 bitmap indicates muting, the corresponding DL PRS resource 820-1 is muted. Also, when a bit corresponding to the second repetition 820-2 of the DL PRS resource in the 2-bit option 2 bitmap indicates muting, the corresponding DL PRS resource 820-2 is muted. The option 2 bitmap may be applied when the option 1 bitmap does not indicate muting.

Figure 9:
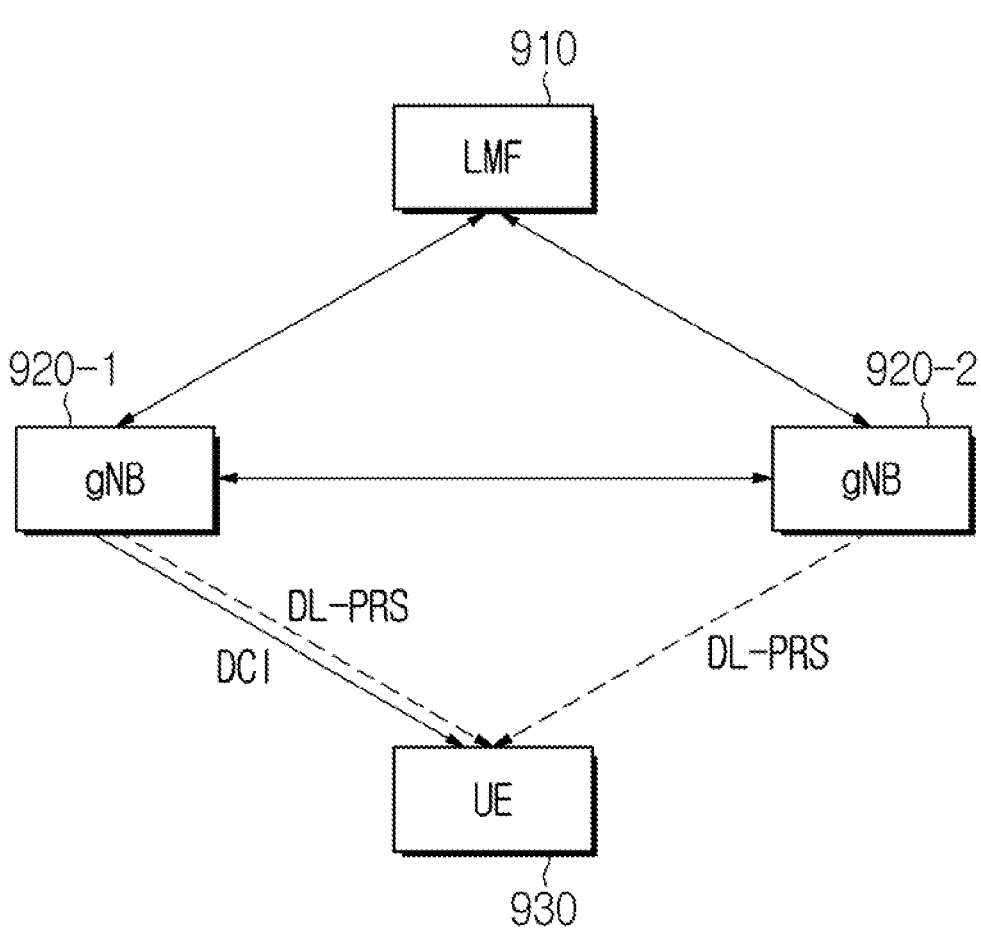
FIG. 9 illustrates a method of performing positioning of a UE to which the present disclosure may apply.

FIG. 9 illustrates a method of performing positioning of a UE to which the present disclosure may apply.

In the existing system, a DL PRS may support only a periodic configuration and may not support an aperiodic configuration. That is, in the existing system, the base station may periodically transmit a DL PRS to the UE, but may not transmit a DL PRS based on an aperiodic method. On the contrary, in the existing system, an SRS for positioning may support an aperiodic configuration. That is, when the UE transmits the SRS for positioning to the base station, the SRS for positioning may be aperiodically transmitted to the base station.

Here, in the existing system, on-demand configuration is not supported in all of the DL PRS and the SRS for positioning. That is, in the existing system, an entity (e.g., LMF) configured to control positioning transmits configuration information on a positioning reference signal related to the UE and/or the base station to the UE and/or the base station and based thereon, may transmit and receive a reference signal. Therefore, even at a point in time at which the UE and/or the base station require positioning, the UE and/or the base station may not request transmission of the reference signal and may transmit and receive the reference signal based on the given configuration. That is, the base station may transmit a DL PRS to the UE at a predetermined period based on the given configuration. Also, the UE may transmit the SRS for positioning periodically or aperiodically based on the given configuration.

Here, since the UE and/or the base station do not request the reference signal for positioning when necessary, latency may occur. Therefore, the UE and/or the base station may require a method of reducing latency and increasing device efficiency (e.g., reducing the resource usage and power saving). For example, dissimilar to the existing system, even in the configuration related to the DL PRS, at least one of aperiodic configuration and on-demand configuration may be supported. For example, in the case of configuring the DL PRS based on the on-demand configuration, the base station may transmit the DL PRS to the UE using an aperiodic method. That is, the base station may trigger a DL PRS transmission in response to a request and, based thereon, may transmit the DL PRS using the aperiodic method. Here, even in the on-demand configuration, periodic transmission of the DL PRS is not excluded and the base station may trigger the periodic DL PRS transmission in response to a request and, based thereon, may periodically transmit the DL PRS. That is, the present disclosure is not limited to the aforementioned example.

Also, for example, dissimilar to the existing system, even in configuration for SRS transmission for positioning, the on-demand configuration may be further considered. That is, in response to a request, even the UE may trigger the SRS transmission for positioning and may transmit an SRS to the base station based on at least one of the periodic method and the aperiodic method. However, the present disclosure is not limited to the aforementioned example. Hereinafter, a method of transmitting a DL PRS and an SRS for positioning is described in consideration of the above description. Also, for example, when a reference signal for positioning is transmitted based on the aperiodic method, the base station may dynamically indicate whether to transmit a reference signal to the UE through DCI, which is described below.

Even a periodic configuration related to a DL PRS may be configured to reduce latency and to increase device efficiency. For example, in the existing system, a positioning frequency layer (PositioningFrequencyLayer) may not support a plurality of DL PRS configurations. That is, even in the same OFDM symbol, only a single positioning frequency layer may be used. Here, to reduce latency and increase device efficiency, up to 4 positioning frequency layers for a DL PRS may be supported in the new system. However, it is provided as an example only and the number of positioning frequency layers may be further increased. The present disclosure is not limited to the aforementioned example.

Also, at least one DL PRS resource set may be configured within a positioning frequency layer. For example, one or two DL PRS resource sets may be configured in a single TRP. In detail, for example, when the number of TRPs is 18 and a single DL PRS resource set is configured for each single TRP, a total number of DL PRS resource sets may be 18. However, it is provided as an example only and the present disclosure is not limited to the aforementioned example. Also, at least one DL PRS resource may be configured within each DL PRS resource set. For example, at least one beam may be considered in a single TRP and a DL PRS resource may correspond to each beam. In detail, for example, if the number of beams considered in a specific TRP is 64 in frequency range 2 (FR2), 64 DL PRS resources corresponding to the respective beams may be included in a DL PRS resource set. However, it is provided as an example only and the present disclosure is not limited to the afore-mentioned example.

Here, parameters for a DL PRS resource set may be as shown in Table 10 and parameters for DL PRS resources may be as shown in Table 11. However, the present disclo-sure is not limited thereto.

TABLE 10

- nr-DL-PRS-ResourceSetId
     ID for identifying a DL PRS resource set
   - dl-PRS-Periodicity-and-ResourceSetSlotOffset
     Period for DL PRS and slot offset for DL PRS resource set
- dl-PRS-ResourceRepetitionFactor
     Number of repetitions of each DL PRS resource in a single DL PRS resource
set
- dl-PRS-ResourceTimeGap
     Indicated as a time interval and the number of slots between two DL PRS
resources repeated in a single DL PRS resource set
- dl-PRS-MutingPatternList
     Indicates a DL PRS resource to be muted in a single DL PRS resource set
- nr-DL-PRS-SFN0-Offset
       Indicates a start point of DL PRS period and an offset value from SFN0
- dl-PRS-CombSizeN
       Indicates DL PRS comb size and comb pattern
- dl-PRS-ResourceBandwidth
       Indicates a bandwidth for DL PRS resource
- dl-PRS-StartPRB
     Indicates a start PRB index for DL PRS

TABLE 11

Figure 10:
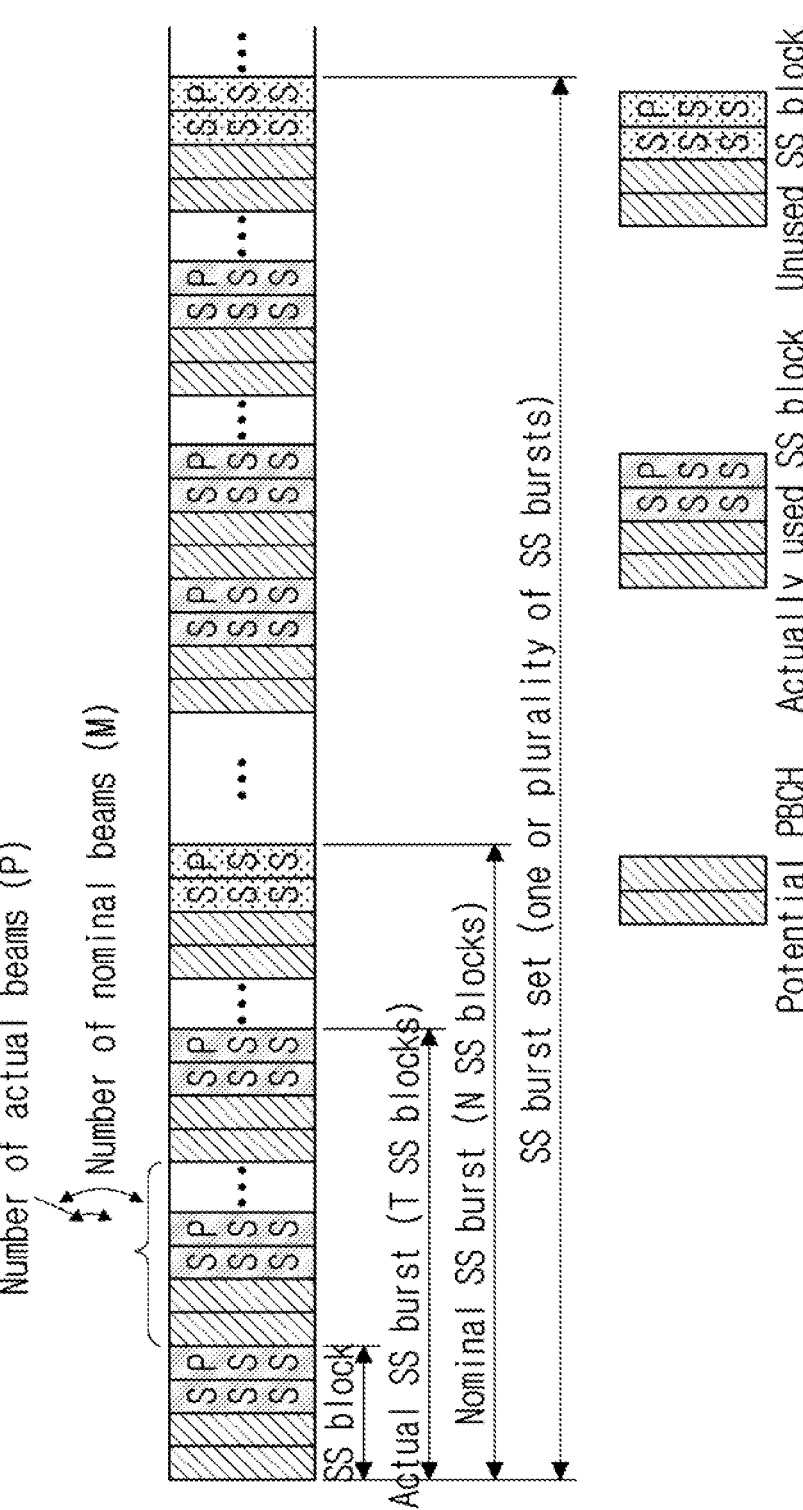
FIG. 10 illustrates a downlink synchronization signal in a wireless communication system to which the present disclosure may apply.

- dl-PRS-ResourceList
   DL PRS resource list within a single DL PRS resource set
- nr-DL-PRS-ResourceId
   DL PRS resource ID within a single DL PRS resource set
- dl-PRS-SequenceId
     Indicates initial value $c_{init}$ for generating a DL PRS
     sequence in DL PRS resource
- dl-PRS-ReOffset
     Indicates a start RE in a single DL PRS resource in a
     frequency domain in consideration of a comb pattern
- dl-PRS-ResourceSlotOffset
     Indicates a start slot in a DL PRS resource corresponding
     to slot offset of a DL PRS resource set
- dl-PRS-ResourceSymbolOffset
     Indicates a start symbol within a slot of DL PRS resource
- dl-PRS-NumSymbols
     Indicates the number of symbols within a slot of DL PRS
- dl-PRS-QCL-Info
       Indicates quasi-co location (QLC) of another signal and DL PRS FIG. 10 illustrates a downlink synchronization signal in a wireless communication system to which the present dis-closure may apply.

For example, in an NR system, two types of synchroni-zation signals may be defined. Here, the two types of synchronization signals may include an NR-primary syn-chronization signal (PSS) and NR-secondary synchroniza-tion signal (SSS). The NR-PSS may be used for synchro-nization for an initial symbol boundary with respect to an NR cell. Also, the NR-SSS may be used to detect an NR cell ID.

Meanwhile, in a previous wireless communication system (e.g., LTE/LTE-A system) of the NR system, 1.08 MHz corresponding to 6 PRBs may be used as a bandwidth for transmission of PSS/SSS and/or Physical Broadcast Channel (PBCH). Here, the NR system may use a wider transmission bandwidth compared to the previous wireless communica-tion system to transmit the NR-PSS/SSS and/or NR-PBCH. To this end, a subcarrier spacing (SCS) greater than 15 kHz may be used.

For example, in the case of operating in 6 GHz or less, one of 15 kHz and 30 kHz may be considered as a default SCS. In the case of operating in 6 GHz or more (e.g., in the case of operating between 6 GHz and 52.5 GHz), one of 120 kHz and 240 kHz may be considered as a default SCS. However, the present disclosure is not limited to the aforementioned example.

In detail, a default SCS set and a minimum carrier bandwidth assumed by the UE during an initial access may be defined as follows. In the case of 6 GHz or less, the UE may basically assume an SCS of 15 kHz and a bandwidth of 5 MHz. Here, in a specific band, an SCS of 30 kHz and a bandwidth of 10 MHz may be assumed without being limited to the aforementioned example. On the contrary, in the case of 6 GHz or more, the UE may assume an SCS of 120 kHz and a bandwidth of 10 MHz.

Also, an SCS supported for data and/or control informa-tion according to a specific frequency band may differ.

For example, in the case of operating in 1 GHz or less, SCSs of 15 kHz, 30 kHz, and 60 kHz may be supported. Also, for example, in the case of operating between 1 GHz and 6 GHz, SCSs of 15 kHz, 30 kHz, and 60 kHz may be supported. As another example, in the case of operating between 24 GHz and 52.6 GHz, SCSs of 60 kHz and 120 kHz may be supported. Meanwhile, for example, 240 kHz may not be supported for data and an SCS to be supported may be determined according to a bandwidth.

The NR-PSS, the NR-SSS, and/or the NR-PBCH may be transmitted within a synchronization signal (SS) block (SSB). Here, the SSB may represent a time-frequency resource area that includes all of the NR-PSS, the NR-SSS, and/or the NR-PBCH.

Here, at least one SSB may constitute an SS burst. A single SS burst may be defined as including a predetermined number of SSBs, which may also be referred to as a duration of the SS burst. However, the present disclosure is not limited to the aforementioned example.

Also, at least one SSB may be consecutive or noncon-secutive within a single SS burst. Also, at least one SSB within a single SS burst may be the same or different.

Also, for example, at least one SS burst may constitute an SS burst set. A single SS burst set may include a predetermined period and a predetermined number of SS bursts. Here, the number of SS bursts within the SS burst set may be finite. Also, a transmission point in time of the SS burst set may be periodically defined and may also be aperiodically defined.

Also, for example, with respect to a specific frequency range or carrier, at least one SCS may be predefined for each synchronization signal (e.g., NR-PSS, NR-SSS, NR-PBCH). Here, an SCS of at least one of 15, 30, 120, and 240 kHz may be applicable.

Here, the same SCS may be applied for the NR-PSS, the NR-SSS, or NR-PBCH. At least one frequency range may be given and different frequency ranges may overlap. Also, a single numerology may be defined for a specific frequency range and a plurality of numerologies may be defined for the specific frequency range. Therefore, a single SCS or a plurality of SCSs may be defined for the specific frequency range. Also, transmission of the SS burst set may be periodic from perspective of the UE.

Figure 11:
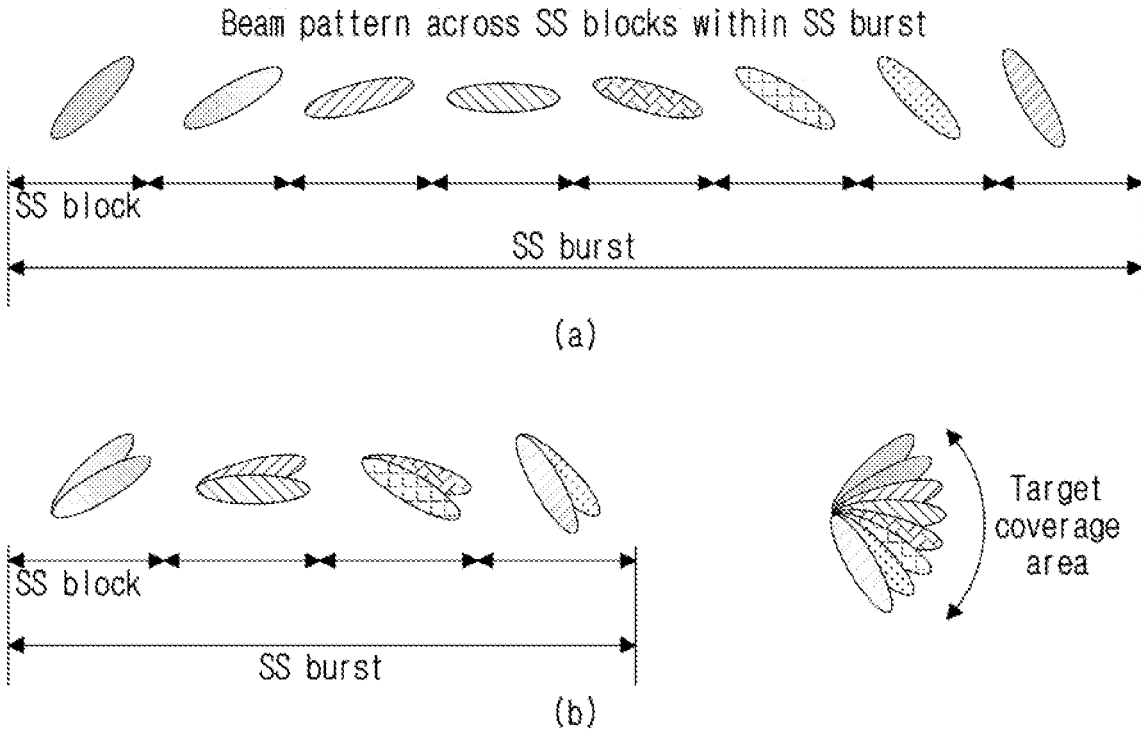
FIG. 11 illustrates an example of transmission through a plurality of beams in a synchronization signal transmission to which the present disclosure may apply.

FIG. 11 illustrates an example of transmission through a plurality of beams in a synchronization signal transmission to which the present disclosure may apply.

To overcome a poor channel environment, such as high pathloss, phase-noise, and frequency offset, occurring on a high carrier frequency, the NR system is considering transmission through a plurality of beams for a synchronization signal, a random access signal, and a broadcast channel.

Here, in the case of transmitting the plurality of beams, the number of beams and a beam width may be differently determined according to a cell environment. That is, the number of beams to be used for transmission and a width of each beam may be variously determined in consideration of the cell environment. Therefore, to provide a degree of freedom in such implementation, it may be necessary to verify the number of beams used to be transmitted on the maximum number of physical resources.

FIG. 11 illustrates a method of transmitting a beam within an SS burst set with a single SSB or a plurality of SSBs.

For example, (a) of FIG. 11 illustrates a case in which a single beam is applied for each SSB and an analog beamforming method is applied. Here, the number of applicable beams may be limited according to the number of radio frequency (RF) chains.

As another example, (b) of FIG. 11 illustrates a case in which two beams are applied to each SSB and a digital beamforming method or a hybrid beamforming method is applied. Here, for example, referring to (b) of FIG. 11, beam sweeping for covering a target coverage area within a faster time may be performed. Therefore, network resource consumption efficiency may be improved by consuming the number of SSBs less than that of (a) of FIG. 11.

Figure 12:
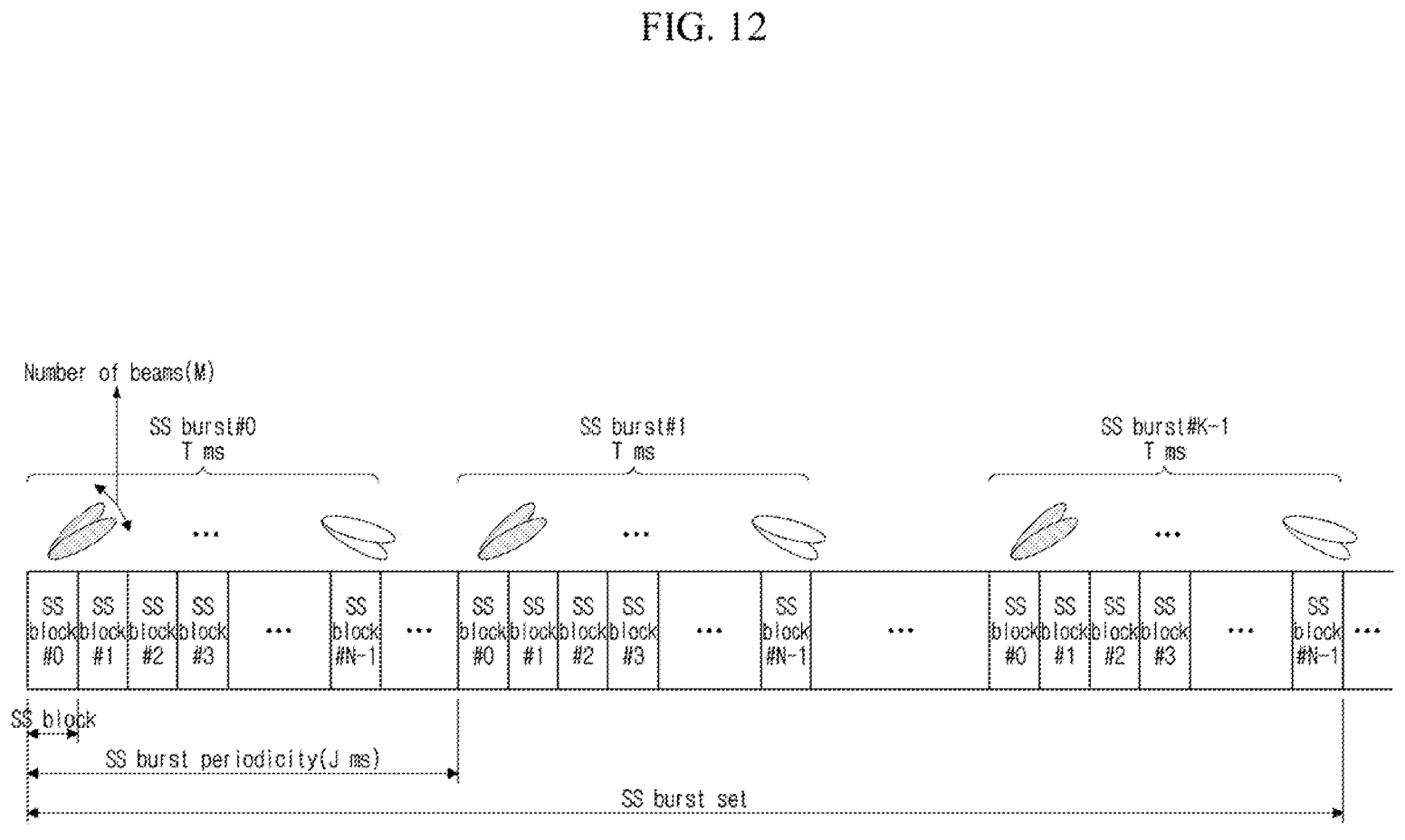

FIG. 12 illustrates a structure of a synchronization signal frame in the case of considering transmission through a plurality of beams in a synchronization signal transmission to which the present disclosure may apply.

Referring to FIG. 12, in the NR system, at least one beam transmission may be applied to the same SSB. When a plurality of beams is transmitted to a single SSB, an SSB transmission to which a different beam pattern is applied through beam sweeping may be applied to satisfy a target coverage area. Here, the target coverage area may represent at least one beam transmission and that each beam transmission is performed to cover the target coverage area based on a beam width/azimuth intended by the base station.

Also, since one or a plurality of beams are used for each single SSB, a synchronization signal may be transmitted. At least one of an NR-PSS, an NR-SSS, and an NR-PBCH may be transmitted within a single SSB. For a given frequency band, a single SSB may correspond to N OFDM symbols defined according to a default SCS. Here, N denotes constant. For example, if N=4, 4 OFDM symbols may be used within a single SSB. Here, one of the four OFDM symbols may be used for the NR-PSS, another one thereof may be used for the NR-SSS, and the remaining two may be used for the NR-PBCH.

Here, referring to FIG. 12, one SSB or a plurality of SSBs may be configured as a single SS burst. The SSBs used to configure a single SSB may be consecutively allocated or nonconsecutively allocated in a time frequency domain or a frequency domain. The present disclosure is not limited to the aforementioned example.

Also, a single SS burst or a plurality of SS bursts may be configured as a single SS burst set. From perspective of the UE, transmission of the SS burst set may be periodic and the UE may assume a default transmission period value during at least an initial cell selection for each specific carrier frequency. The UE may receive updated information on an SS burst set transmission period from the base station.

Meanwhile, the UE may induce a symbol/slot index and a radio frame index from a single SSB time index. A symbol/slot index and a radio frame index according to a time index of each SSB may be pre-configured. Therefore, in the case of verifying the time index of each SSB, a frame/symbol timing of each SSB may be verified through a relationship between the SSB time index and the symbol/slot and radio frame indexes pre-configured for each SSB. Through this, the entire frame/symbol timing may be known. Here, the SSB time index may be an SS burst index within an SS burst set. Also, for example, the SSB time index may be a time index for a single SSB for each SSB within a single SS burst. As another example, the SSB time index may be a time index for a single SSB for each SSB within the SS burst set.

Also, for example, transmission of SSBs within the SS burst set may be limited to a 5-ms window regardless of the SS burst set period. Here, the number of possible SSB location candidates within the 5-ms window may be L.

In detail, a value of L that is the maximum number of SSBs within the SS burst set may be determined according to the frequency range. Here, for example, L=4 in the frequency range up to 3 GHz. Also, for example, L=8 in the frequency range from 3 GHz to 6 GHz. Also, for example, L=64 in the frequency range from 6 GHz to 52.6 GHz.

Also, for example, in the case of an initial access such as a cell selection, a default value for the SS burst set period may be set to 20 ms. However, the present disclosure is not limited to the aforementioned example.

Hereinafter, a method of configuring an aperiodic DL PRS based on the above is described.

For example, an aperiodic DL PRS configuration may be performed dynamic signaling triggered by DCI. That is, the base station may include DL PRS related information in the DCI and may transmit the same to the UE. The UE may verify the DL PRS related information included in the DCI and then, based thereon, may receive a DL PRS from the base station.

Also, the DL PRS configuration may be configured based on an on-demand DL PRS. That is, a DL PRS may be configured upon request. For example, when positioning is required based on the on-demand DL PRS, the UE may request the DL PRS to the base station. The base station may transmit a UE-specific DL PRS to the corresponding UE. Here, the base station may indicate the UE-specific DL PRS information through the DCI and the UE may verify the DCI and then may receive the DL PRS.

That is, the DL PRS configuration may be performed based on dynamic signaling using an on-demand method and, based thereon, a DL PRS may be transmitted. Here, the dynamic signaling-based DL PRS configuration may be performed although it is not the on-demand method. That is, although it is not triggered by the request, the base station may include DL PRS information in the DCI and may transmit the same to the UE and then may transmit the DL PRS. The present disclosure is not limited to the aforementioned example.

Here, for example, a field that includes DL PRS related information may be configured in DCI for dynamic DL PRS configuration triggered by the DCI. In detail, a DL PRS request field related to the dynamic DL PRS configuration may be configured in the DCI using 2 bits as shown in the following Table 12. Here, a first value of 2 bits may indicate that an aperiodic DL PRS resource set is not triggered. On the contrary, each of remaining values of 2 bits may indicate an aperiodic DL PRS trigger list as a case in which the aperiodic DL PRS is triggered.

Also, for example, the DL PRS request field may be configured in the DCI with 1 bit as shown in the following Table 13. Here, a first value of 1 bit may indicate that an aperiodic DL PRS resource set is not triggered. On the contrary, a remaining value of 1 bit may indicate a DL PRS resource trigger list (aperiodicPRS-ResourceTriggerList) as a case in which the aperiodic DL PRS is triggered. Also, for example, the DL PRS request field may be configured in the DCI with 3 bits as shown in the following Table 14. Here, a first value of 3 bits may indicate that the aperiodic DL PRS resource set is not triggered.

On the contrary, remaining values of 3 bits may indicate a DL PRS resource trigger list (aperiodicPRS-ResourceTriggerList) as a case in which the aperiodic DL PRS is triggered. However, it is provided as an example only. A bit of the DL PRS request field may be differently configured in a DCI field based on the DL PRS resource list without being limited to the aforementioned example.

TABLE 12

| Value of DL PRS request field | Triggered aperiodic DL PRS resource set(s) |
|---|---|
| 00 | No aperiodic DL PRS resource set triggered |
| 01 | DL PRS resource set(s) configured by nr-DL-PRS-ResourceSet-r17 with an entry in aperiodicPRS-ResourceTriggerList set to 1 |
| 10 | DL PRS resource set(s) configured by nr-DL-PRS-ResourceSet-r17 with an entry in aperiodicPRS-ResourceTriggerList set to 2 |
| 11 | DL PRS resource set(s) configured by nr-DL-PRS-ResourceSet-r17 with an entry in aperiodicPRS-ResourceTriggerList set to 3 |

TABLE 13

| Value of DL PRS request field | Triggered aperiodic DL PRS resource set(s) |
|---|---|
| 0 | No aperiodic DL PRS resource set triggered |
| 1 | DL PRS resource set(s) configured by nr-DL-PRS-ResourceSet-r17 with an entry in aperiodicPRS-ResourceTriggerList set to 1 |

TABLE 14

| Value of DL PRS request field | Triggered aperiodic DL PRS resource set(s) |
|---|---|
| 000 | No aperiodic DL PRS resource set triggered |
| 001 | DL PRS resource set(s) configured by nr-DL-PRS-ResourceSet-r17 with an entry in aperiodicPRS-ResourceTriggerList set to 1 |
| 010 | DL PRS resource set(s) configured by nr-DL-PRS-ResourceSet-r17 with an entry in aperiodicPRS-ResourceTriggerList set to 2 |
| 011 | DL PRS resource set(s) configured by nr-DL-PRS-ResourceSet-r17 with an entry in aperiodicPRS-ResourceTriggerList set to 3 |
| 100 | DL PRS resource set(s) configured by nr-DL-PRS-ResourceSet-r17 with an entry in aperiodicPRS-ResourceTriggerList set to 4 |
| 101 | DL PRS resource set(s) configured by nr-DL-PRS-ResourceSet-r17 with an entry in aperiodicPRS-ResourceTriggerList set to 5 |
| 110 | DL PRS resource set(s) configured by nr-DL-PRS-ResourceSet-r17 with an entry in aperiodicPRS-ResourceTriggerList set to 6 |
| 111 | DL PRS resource set(s) configured by nr-DL-PRS-ResourceSet-r17 with an entry in aperiodicPRS-ResourceTriggerList set to 7 |

Here, referring to the above Table 12 to Table 14, a case in which the aperiodic DL PRS resource trigger list (aperiodicPRS-ResourceTriggerList) is set to k may be considered. Here, $k \in \{1, 2, \ldots, N\}$. If the DL PRS request field of the DCI includes 2 bits as shown in Table 12, N may be 3. If the DL PRS request field of the DCI includes 1 bit as shown in Table 13, N may be 1. If the DL PRS request field of the DCI includes 3 bits as shown in Table 14, N may be 7. For example, in Table 12 to Table 14, a resource set parameter for DL PRS (e.g., nr-DL-PRS-ResourceSet-r17) may represent a set of parameters required for a case in which a resource set for aperiodic DL PRS is configured. For example, a resource set parameter for aperiodic DL PRS may correspond to a parameter for the existing periodic DL PRS resource set (e.g., nr-DL-PRS-ResourceSet-r16 or Table 10). Here, "nr-DL-PRS-ResourceSet-r17" is provided as an example only and the present disclosure is not limited to the aforementioned name. Also, a resource parameter for aperiodic DL PRS (e.g., nr-DL-PRS-Resource-r17) may represent a set of parameters required when a resource for aperiodic DL PRS is configured. For example, a resource parameter for aperiodic DL PRS may correspond to a parameter for the existing periodic DL PRS (e.g., nr-DL-PRS-Resource-r16 or Table 11). Here, "nr-DL-PRS-Resource-r17" is provided as an example only and the present disclosure is not limited to the aforementioned name.

Here, the resource set parameter for aperiodic DL PRS and the resource parameter for aperiodic DL PRS may have different values according to an aperiodic DL PRS resource trigger list (aperiodicPRS-ResourceTriggerList), which is described below.

The resource set parameter for aperiodic DL PRS may be configured by modifying parameters belonging to the existing periodic DL PRS resource set (e.g., nr-DL-PRS-ResourceSet-r16 or Table 10) in consideration of an aperiodic environment. Also, the resource parameter for aperiodic DL PRS may be configured by modifying parameters belonging to the existing periodic DL PRS resource (e.g., nr-DL-PRS-Resource-r16 or Table 11) in consideration of the aperiodic environment. Description related thereto is made below.

Also, for example, frequency division multiplexing (FDM) of the existing DL PRS at a PRB-level is not allowed in the same OFDM symbol of another channel/signal. However, since transmission by a DL PRS may be delayed from standpoint of the other channel/signal, the DL PRS and the other channel/signal need to be frequency-division multiplexed in the same OFDM symbol and transmitted as a method of improving device efficiency (e.g., reducing the resource usage). Since the aperiodic DL PRS may be transmitted in association with the other channel/signal, the transmission delay of the aperiodic DL PRS may be reduced. Considering this, multiplexing transmission of the DL PRS and the other channel/signal using FDM in the same OFDM symbol may be allowed.

Here, the UE may need to determine whether the other channel/signal configured in the same OFDM symbol with FDM in association with the aperiodic DL PRS needs to be transmitted from the base station and to be decoded and may require dynamic signaling. For example, an additional parameter for indicating whether FDM of the aperiodic DL PRS and the other channel/signal at the PRB-level in the same OFDM symbol is allowed may be configured for dynamic signaling, which is further described below.

As another example, the existing DL PRS may configure a parameter (e.g., nr-DL-PRS-Resource-r16 or Table 11) in consideration of all beams. Here, when the DL PRS is triggered to the UE based on the on-demand DL PRS configuration, the UE may receive the DL PRS through only some beams (subset of beams). Here, the on-demand DL PRS configuration may be based on UE-assisted and/or UE-based positioning. That is, dissimilar to the DL PRS of the existing system, the UE-specific DL PRS that considers only some beams may be configured and based thereon, transmission may be performed. In detail, for example, different UEs may have different positioning accuracy and latency and may have different beam directions for a TRP and thus, may have different requirements in terms of DL PRS transmission. Therefore, the DL PRS may consider transmission of only some beams rather than all beams in consideration of device efficiency. Therefore, when the aperiodic DL PRS is configured, whether the DL PRS considers all beams or considers only some beams needs to be indicated and a parameter for this needs to be configured. Further description is made below.

Also, in the case of the DL PRS that considers only some beams (subset of beams), only a portion of PRS resources (e.g., specific comb pattern only) may be used. Therefore, remaining resources may be used by other UEs and a parameter indicating this may be configured. In detail, for example, a UE in which a UE-specific DL PRS is configured may use only a portion of DL PRS resources used by considering all beams and may not use remaining resources. Here, the UE may not verify whether another resource excluding a DL PRS resource used by the UE among DL PRS resources available for all beams is being used by another UE. The UE may need to verify whether remaining resources are available in consideration of rating matching and thus, may require dynamic signaling for this. Further description related thereto is made below.

Also, for example, when the aperiodic DL PRS is configured in the UE, the UE may need to determine whether to maintain the existing periodic DL PRS transmission. That is, the UE may need to determine whether to overlappingly perform periodic DL PRS transmission together with aperiodic DL PRS transmission. Therefore, when the aperiodic DL PRS is configured in the UE, an additional parameter indicating transmission or non-transmission of the existing DL PRS needs to be configured. For example, when the aperiodic DL PRS is configured in a specific PRS occasion, the periodic DL PRS may not be transmitted in the corresponding PRS occasion or a subsequent PRS occasion and through this, device efficiency may be improved. Here, although the aperiodic DL PRS is configured, the existing periodic DL PRS may be transmitted and this case, accuracy may be improved. Therefore, the periodic DL PRS needs to be maintained and thus, when the aperiodic DL PRS is configured, dynamic signaling may be required regarding whether to maintain the periodic DL PRS. Further description related thereto is made below.

For example, a parameter for aperiodic DL PRS resource (e.g., nr-DL-PRS-Resource-r17) may be configured by modifying a parameter for the existing periodic DL PRS resource (e.g., nr-DL-PRS-Resource-r16 or Table 11) in consideration of an aperiodic environment.

In detail, for example, in the above Table 12 to Table 14, a case in which the aperiodic DL PRS resource trigger list (aperiodicPRS-ResourceTriggerList) is set to k may be considered. Here, k∈{1, 2, . . . , N}. If the DL PRS request field of the DCI includes 2 bits as in Table 12, N may be 3. If the DL PRS request field of the DCI includes 1 bit as in Table 13, N may be 1. If the DL PRS request field of the DCI includes 3 bits as in Table 14, N may be 7. For example, a parameter for the aperiodic DL PRS resource set (e.g., nr-DL-PRS-ResourceSet-r17) may correspond to a parameter for the existing periodic DL PRS resource set (e.g., nr-DL-PRS-ResourceSet-r16 or Table 10). Here, the parameter "nr-DL-PRS-ResourceSet-r17" is provided as an example only and the present disclosure is not limited to the name.

Also, each of parameters belonging to a parameter for the aperiodic DL PRS resource set may have an independently different value according to a value of the aperiodic DL PRS resource trigger list (aperiodicPRS-ResourceTriggerList). Here, if the value of the aperiodic DL PRS resource trigger list (aperiodicPRS-ResourceTriggerList) is a first value, values of the parameters belonging to the parameter for the aperiodic DL PRS resource set may be identically set to the parameter for the existing periodic DL PRS resource set (e.g., nr-DL-PRS-ResourceSet-r16, or Table 10). That is, one of values of the aperiodic DL PRS resource trigger list (aperiodicPRS-ResourceTriggerList) may be identically set to the existing parameter and other values may be independently set for the respective parameters belonging to the parameter for the aperiodic DL PRS resource set.

In detail, for example, a DL PRS resource set ID parameter of the parameter for the aperiodic DL PRS resource set (e.g., nr-DL-PRS-ResourceSetId-r17) may be identically set to the existing DL PRS resource set ID parameter (e.g., nr-DL-PRS-ResourceSetId-r16 or nr-DL-PRS-Resource-SetId of Table 10).

Also, in the case of configuring the aperiodic DL PRS, periodicity and offset related information may not be required and thus, the existing periodicity and offset related parameter (e.g., dl-PRS-Periodicity-and-ResourceSetSlot-Offset-r16 or dl-PRS-Periodicity-and-ResourceSetSlotOff-set of Table 10) may not be required.

Also, for example, in the case of configuring the aperiodic DL PRS, the DL PRS may be transmitted only in a single slot (one-shot aperiodic DL PRS). In the above case, a repetition related parameter (e.g., dl-PRS-ResourceRepeti-tionFactor-r17) may not be required. That is, since the DL PRS is transmitted only once, the repetition related parameter may not be configured. As another example, although the DL PRS is configured using the aperiodic method, the DL PRS may be repetitively transmitted. Here, the repetition related parameter (e.g., dl-PRS-ResourceRepetitionFactor-r17) may be configured in the same manner as that of the existing repetition related parameter (e.g., dl-PRS-Re-sourceRepetitionFactor-r16 or dl-PRS-ResourceRepetition-Factor of Table 10).

As another example, although the DL PRS is not transmitted in a single slot, the repetition resource related parameter (e.g., dl-PRS-ResourceRepetitionFactor-r17) may be set to {1, 2}, {1, 2, 4}, or {1, 2, 4, 8} in {1, 2, 4, 6, 8, 16, 32} indicated by the existing repetition related parameter in consideration of latency.

Also, for example, in the case of configuring the aperiodic DL PRS, the DL PRS may be transmitted only in a single slot (one-shot aperiodic DL PRS). In the above case, a muting pattern related parameter (e.g., dl-PRS-MutingPatternList-r17) may not be required. That is, since the DL PRS is transmitted only once, the muting related parameter may not be configured.

As another example, dissimilar to the existing muting related parameter (e.g., dl-PRS-MutingPatternList-r16 or dl-PRS-MutingPatternList-r16 of Table 10), the muting pattern related parameter (e.g., dl-PRS-MutingPatternList-r17) may be configured to consider only the muting option 2 of configuring muting in consideration of a PRS repetition unit (i.e., slot unit in which a PRS is transmitted) without considering the muting option 1 of configuring muting in consideration of a DL PRS occasion unit. The present disclosure is not limited to the aforementioned example.

Also, when the aperiodic DL PRS is configured, the aperiodic DL PRS transmission may be performed. Therefore, a parameter corresponding to an SFN offset related parameter (e.g., nr-DL-PRS-SFN0-Offset-r16) may not be required.

Also, for example, a comb pattern related parameter (e.g., dl-PRS-CombSizeN-r17) may be identically set to the existing comb pattern parameter (e.g., dl-PRS-CombSizeN-r16 or dl-PRS-CombSizeN of Table 10).

As another example, the comb pattern related parameter (e.g., dl-PRS-CombSizeN-r17) may be configured by adding or deleting some sizes from {2, 4, 6, 12} that are comb sizes available in the existing comb pattern parameter. In detail, comb size {1} may be added to the existing comb pattern related parameter in consideration of latency. Alternatively, comb size {12} or {6, 12} may be deleted from the existing comb pattern related parameter in consideration of the latency. The present disclosure is not limited to the aforementioned example.

Also, for example, a PRS resource bandwidth related parameter (e.g., dl-PRS-ResourceBandwidth-r17) may be identically set to the existing comb pattern parameter (e.g., dl-PRS-ResourceBandwidth-r16 or dl-PRS-ResourceBand-width of Table 10).

Also, for example, a PRS resource start PRB related parameter (e.g., dl-PRS-StartPRB-r17) may be identically set to the existing comb pattern parameter (e.g., dl-PRS-StartPRB-r16 or dl-PRS-StartPRB of Table 10).

Also, the aperiodic DL PRS resource parameter (e.g., nr-DL-PRS-Resource-r17) may be configured by modifying parameters belonging to the existing periodic DL PRS resource (e.g., nr-DL-PRS-Resource-r16 or Table 11) in consideration of the aperiodic environment.

Here, in the above Table 12 to Table 14, a case in which the aperiodic DL PRS resource trigger list (aperiodicPRS-ResourceTriggerList) is set to k may be considered. Here, k∈{1, 2, . . . , N}. If the DL PRS request field of the DCI includes 2 bits as in Table 12, N may be 3. If the DL PRS request field of the DCI includes 1 bit as in Table 13, N may be 1. If the DL PRS request field of the DCI includes 3 bits as in Table 14, N may be 7. For example, the aperiodic DL PRS resource parameter (e.g., nr-DL-PRS-Resource-r17) may represent a set of parameters required when a resource for the aperiodic DL PRS is configured. For example, the aperiodic DL PRS resource parameter may correspond to the parameter for the existing periodic DL PRS resource (e.g., nr-DL-PRS-Resource-r16 or Table 10).

Also, each of parameters belonging to the aperiodic DL PRS resource parameter may have an independently different value according to a value of the aperiodic DL PRS resource trigger list (aperiodicPRS-ResourceTriggerList).

Here, if the value of the aperiodic DL PRS resource trigger list (aperiodicPRS-ResourceTriggerList) is a first value, values of parameters belonging to the aperiodic DL PRS resource parameter may be identically set to the existing parameter for the periodic DL PRS resource set (e.g., nr-DL-PRS-Resource-r16 or Table 10). That is, one of values of the aperiodic DL PRS resource trigger list (aperiodicPRS-ResourceTriggerList) may be identically set to the existing parameter and other values may be independently set for the respective parameters.

Also, for example, the PRS resource list related parameter within the aperiodic DL PRS resource parameter (e.g., dl-PRS-ResourceList-r17) may be identically set to the existing PRS resource list related parameter (e.g., dl-PRS-ResourceList-r16 or dl-PRS-ResourceList of Table 10).

Also, for example, the PRS resource ID related parameter within the aperiodic DL PRS resource parameter (e.g., nr-DL-PRS-ResourceId-r17) may be identically set to the existing PRS resource ID related parameter (e.g., nr-DL-PRS-ResourceId-r16 or nr-DL-PRS-ResourceId of Table 10). Here, some of available PRS resource ID values may be restricted.

Also, for example, the PRS sequence related parameter within the aperiodic DL PRS resource parameter (e.g., dl-PRS-SequenceId-r17) may be identically set to the existing PRS sequence related parameter (e.g., dl-PRS-Sequen-ceId-r16 or dl-PRS-SequenceId of Table 10).

Also, for example, a PRS RE offset related parameter within the aperiodic DL PRS resource parameter (e.g., dl-PRS-ReOffset-r17) may be identically set to the existing PRS RE offset related parameter (e.g., dl-PRS-ReOffset-r16 or dl-PRS-ReOffset of Table 10). Here, some of available PRS RE offset values may be restricted.

Also, for example, a PRS resource slot offset parameter within the aperiodic DL PRS resource parameter (dl-PRS-ResourceSlotOffset-r17) may be differently configured based on an aperiodic DL PRS transmission method. For example, when the aperiodic DL PRS is transmitted only in a single slot (one-shot aperiodic DL PRS), the PRS resource slot offset parameter may not be required.

On the contrary, when the aperiodic DL PRS is repetitively transmitted, the PRS resource slot offset parameter may be identically set to the existing PRS resource slot offset parameter (e.g., dl-PRS-ResourceSlotOffset-r16 or dl-PRS-ResourceSlotOffset of Table 10). As another example, although the aperiodic DL PRS is repetitively transmitted, the PRS resource slot offset parameter may be configured as {1, 2} or {1, 2, 4} in consideration of latency, without being limited to the aforementioned example. Also, some of PRS resource slot offset values may be restricted and further description related thereto is made below.

Also, for example, a PRS resource symbol offset related parameter within the aperiodic DL PRS resource parameter (e.g., dl-PRS-ResourceSymbolOffset-r17) may be identically set to the existing PRS resource symbol offset related parameter (e.g., dl-PRS-ResourceSymbolOffset-r16 or dl- PRS-ResourceSymbolOffset of Table 10). Here, some of available PRS resource symbol offset values may be restricted.

Also, for example, a parameter related to the number of PRS symbols within the aperiodic DL PRS resource parameter (e.g., dl-PRS-NumSymbols-r17) may be identically set to the existing parameter related to the number of PRS symbols (e.g., dl-PRS-NumSymbols-r16 or dl-PRS-NumS-ymbols of Table 10). Here, some of available PRS resource symbol offset values may be restricted.

Also, for example, a PRS QCL information related param- eter (e.g., dl-PRS-QCL-Info-r17) may be identically set to the existing PRS QCL information related parameter (e.g., dl-PRS-QCL-Info-r16 or dl-PRS-QCL-Info of Table 10). Description related thereto is made below.

Here, for example, a periodic configuration related to a DL PRS may be configured to reduce latency and to improve device efficiency. For example, in the existing system, a positioning frequency layer (PositioningFrequencyLayer) may not support a plurality of DL PRS configurations. That is, only a single positioning frequency layer may be used in the same OFDM symbol. Here, to reduce the latency and to improve the device efficiency, up to 4 positioning frequency layers for a DL PRS may be supported in the new system. However, it is provided as an example only and the number of positioning frequency layers may be further increased. The present disclosure is not limited to the aforementioned example.

Also, at least one DL PRS resource set may be configured within a positioning frequency layer. For example, 1 or 2 DL PRS resource sets may be configured in a single TRP. In detail, for example, when the number of TRPs is 18 and a single DL PRS resource set is configured for each single TRP, the total number of DL PRS resource sets may be 18. However, it is provided as an example only and the present disclosure is not limited to the aforementioned example. Also, at least one DL PRS resource may be configured within each DL PRS resource set. For example, at least one beam may be considered in a single TRP and a DL PRS resource may correspond to each beam. In detail, for example, if the number of beams considered in a specific TRP is 64 in FR2, 64 DL PRS resources corresponding to the respective beams may be included in a DL PRS resource set. However, it is provided as an example only and the present disclosure is not limited to the aforementioned example.

Therefore, each k value of each aperiodic DL PRS resource trigger list (aperiodicPRS-ResourceTriggerList) may be configured with at least one DL PRS resource set. Also, each DL PRS resource set may include at least one DL PRS in consideration of at least one beam. Here, a parameter for each DL PRS resource set may correspond to each DL PRS resource list parameter (e.g., dl-PRS-ResourceList-r17).

In detail, for example, when the aperiodic DL PRS resource trigger list (aperiodicPRS-ResourceTriggerList) is set to k, a DL PRS resource set (e.g., nr-DL-PRS-Resource-Set-r17) of which a DL PRS resource set ID parameter (e.g., "nr-DL-PRS-ResourceSetId-r17") is $A_1$ may be configured. Here, since 1 or 2 DL PRS resource sets are considered for each TRP, a DL PRS resource set (e.g., nr-DL-PRS-ResourceSet-r17) of which a DL PRS resource set ID param-eter (e.g., "nr-DL-PRS-ResourceSetId-r17") is $A_2$ may be additionally considered.

Also, if the number of beams considered is M, M DL PRS resource parameters (nr-DL-PRS-Resource-r17) may be present within a DL PRS resource set of which a DL PRS resource set ID parameter is $A_i$. That is, DL PRS resources may correspond to beams, respectively. Here, for all of the M DL PRS resource parameters, the DL PRS resource list (e.g., dl-PRS-ResourceList-r17) may be $B_i$. That is, the M DL PRS resource parameters may correspond in association with the DL PRS resource set of which the DL PRS resource set ID parameter is $A_i$. Also, although the DL PRS resource list parameters are the same as $B_i$ for M DL PRS resource parameters, each DL PRS resource ID parameter (e.g., nr-DL-PRS-ResourceId-r17) may have a single value among different M values. That is, each DL PRS resource ID may be different.

As another example, in the case of transmitting an ape-riodic DL PRS, the DL PRS and another channel/signal may be transmitted based on FDM of a PRB level in the same OFDM symbol. Here, the DL PRS may be multiplexed with the other channel/signal at the PRB level in the same OFDM symbol in consideration of latency. On the contrary, the DL PRS may not be multiplexed with the other channel/signal at the PRB level in the same OFDM symbol in consideration of accuracy. Whether FDM of the DL PRS and the other channel/signal at the PRB level in the same OFDM symbol is allowed needs to be indicated and a parameter for this may be configured. Here, the UE may need to determine whether the other channel/signal configured in the same OFDM symbol with FDM in association with the aperiodic DL PRS needs to be transmitted from the base station and to be decoded and thus, for this, may require dynamic signaling. An additional parameter for indicating whether FDM of the aperiodic DL PRS and the other channel/signal at the PRB level in the same OFDM symbol may be included for the above dynamic signaling.

Here, for example, if the parameter is set to 1 bit and a bit value is a first value, it may indicate that FDM of the DL PRS and the other channel/signal at the PRB level in the same OFDM symbol is allowed. Also, for example, if the bit value is a second value, it may indicate that FDM of the DL PRS and the other channel/signal at the PRB level in the same OFDM symbol is not allowed.

Here, if a value acquired by excluding the number of PRBS for DL PRS according to a DL PRS resource band-width parameter (e.g., dl-PRS-ResourceBandwidth-r17) from a total number of PRBs available in a single OFDM symbol is less than N (e.g., N=20 (number of PRBs for SSB)), it may be configured such that FDM of the DL PRS and the other channel/signal at the PRB level in the same OFDM symbol is not allowed regardless of the bit.

Also, for example, when whether FDM of the DL PRS and the other channel/signal at the PRB level in the same OFDM symbol is allowed is indicated based on the bit, the parameter may be configured with a lower bit within the DL PRS resource set parameter (e.g., nr-DL-PRS-ResourceSet-r17) and performed. That is, a parameter for a bit indicating whether FDM of the DL PRS and the other channel/signal at the PRB level in the same OFDM symbol is allowed may be configured in a plurality of parameters included in the DL PRS resource set parameter and signaled.

As another example, the bit may be set to a field of the DL PRS resource set parameter (e.g., nr-DL-PRS-ResourceSet-r17) and signaled. That is, the field of the DL PRS resource set parameter may further include 1 bit indicating whether FDM of the DL PRS and the other channel/signal at the PRB level in the same OFDM symbol is allowed and through this, be signaled.

As another example, the bit may be set to 1 bit within DCI regardless of the DL PRS resource set parameter and sig-naled and the present disclosure is not limited to the afore-mentioned example.

As another example, whether FDM of the DL PRS and the other channel/signal at the PRB level in the same OFDM symbol is allowed may be indicated based on whether the DL PRS corresponds to a periodic transmission. For example, a periodic DL PRS may be configured such that FDM of the DL PRS and the other channel/signal at the PRB level in the same OFDM symbol is not allowed at all times. On the contrary, an aperiodic DL PRS may be configured such that FDM of the DL PRS and the other channel/signal at the PRB level in the same OFDM symbol is allowed at all times. Even in the above case, if a value acquired by excluding the number of PRBs for DL PRS according to the DL PRS resource bandwidth parameter (e.g., dl-PRS-Re-sourceBandwidth-r17) from a total number of PRBs available in a single OFDM symbol is less than N (e.g., N=20 (number of PRBs for SSB)), it may be configured such that FDM of the DL PRS and the other channel/signal at the PRB level in the same OFDM symbol is not allowed regardless of the bit.

Also, for example, as in Table 11, QCL information of another signal and DL PRS resource may be indicated as the DL PRS resource related parameter. For example, QCL may indicate a case in which a channel of another one antenna port may be inferred through a channel characteristic of one antenna port symbol among different antenna ports. That is, since different antenna ports perform transmission based on similar channel environments, a channel environment of a corresponding signal may be estimated based on channel environment information of the other signal. Here, each Transmission Configuration Indicator (TCI)-State may include a parameter that configures QCL between reference signals and QCL types may be shown in the following Table 15.

Here, the QCL information parameter (e.g., dl-PRS-QCL-Info-r16) may indicate QCL information of another reference signal and DL PRS resource. In detail, the QCL information parameter may include at least one of PCI information, SSB index information, and QCL type information as an SSB related parameter as a source reference signal of DL PRS. Here, the PCI information may indicate a physical cell ID and the SSB index information may indicate an index of an SSB that is the source reference signal of the DL PRS. Also, the QCL type information may indicate at least one of QCL types shown in Table 15. For example, the DL PRS may be set to at least one of QCL-TypeC and QCL-TypeD among the QCL types shown in Table 15. Also, the QCL information parameter may include at least one of a QCL DL PRS resource ID parameter (e.g., qcl-dl-PRS-ResourceID) and a QCL DL PRS resource set ID (e.g., qcl-dl-PRS-ResourcesetID) in association with the DL PRS.

In detail, for example, the DL PRS resource may be set to another DL PRS or synchronization signal block (SSB) and QCL-TypeD of the following Table 15. That is, the DL PRS may be inferred to be the same up to a reception parameter based on the SSB. As another example, the DL PRS resource may be set to the SSB and QCL-TypeC of the following Table 15. That is, the DL PRS may be inferred to have the same doppler shift and average delay for the SSB. Here, the UE may estimate a channel environment for the DL PRS through a parameter indicating SSB related information and QCL information.

TABLE 15

- 'QCL-TypeA': {Doppler shift, Doppler spread, average delay, delay spread}

TABLE 15-continued

- 'QCL-TypeB': {Doppler shift, Doppler spread}
- 'QCL-TypeC': {Doppler shift, average delay}
- 'QCL-TypeD': {Spatial Rx parameter}

In detail, for example, FIG. 13 may illustrate a case in which a physical cell ID is "A" as PCI information and a QCL type is QCL type-D or QCL type-C/QCL type-D as QCL type information. Here, an SSB index may be 0 to 63 based on the number of beams. Also, 1 or 2 DL PRS resource sets may be configured for each single TRP. In detail, for example, in FIG. 13, two DL PRS resource sets may be configured in a TRP by considering a wide beam and a narrow beam. Here, an ID of one DL PRS resource sets may be "X" and an ID of the other DL PRS resource set may be "Y." Also, DL PRS resources may be included in each DL PRS resource set. Here, for example, each SSB index may correspond to each corresponding DL PRS resource ID. As another example, a plurality of SSB indexes may correspond to a single DL PRS resource ID and the present disclosure is not limited to the aforementioned example. Here, the existing DL PRS may be transmitted through all the beams. Here, when a UE-specific DL PRS is transmitted based on an on-demand method, each UE may receive the DL PRS by considering only some beams (subset of beams) based on a best beam. For example, in FIG. 13, UE A may receive the UE-specific DL PRS through a DL PRS resource set and a DL PRS resource corresponding to a best beam of UE A. Also, UE B may receive a DL PRS corresponding to a best beam of the UE B. Here, the base station may require a configuration for verifying best beams for each UE as above and transmitting a DL PRS through some beams based thereon.

For example, the base station may use beam information configured in an SSB through QCL-type-D. In detail, the base station (e.g., serving cell/non-serving cell) may transmit the SSB to the UE. Here, the UE may perform measurement based on the received SSB and may report measurement results to the base station. Reporting information may include information indicating which beams are best beams for a corresponding UE among beams (corresponding to SSB indexes 0 to 63) configured in the SSB. Then, the base station may transmit the reporting information received from the UE to an LMF. The LMF may transmit QCL information and DCI configuration information to the base station based on the received reporting information.

Here, when the aperiodic DL PRS is configured based on the reporting information, the LMF may include, in the DCI configuration information, parameter information for indicating whether to use all beams or whether it is the DL PRS that considers only some beams (subset of beams) and may transmit the same to the base station. Also, for example, in the case of performing DL PRS transmission that considers only some beams, only some of DL PRS resources available by considering all beams may be used. Here, remaining DL PRS resources among the DL PRS resources available by considering all beams may be used by another UE and a parameter indicating whether the other UE is using the remaining DL PRS resources may be configured. For example, in the case of performing DL PRS transmission by considering a subset of beams, the DCI configuration information may include a parameter indicating whether the other UE is using the remaining DL PRS resources among the DL PRS resources available by considering all beams.

Then, the base station may configure DCI in consideration of the DCI configuration information and may transmit the same to the UE. Here, when the aperiodic DL PRS is configured, the base station may include, in the DCI, parameter information for indicating whether to use all beams or whether it is the DL PRS that considers only some beams (subset of beams) and may transmit the same to the UE.

Also, for example, in the case of performing DL PRS transmission in consideration of some beams, the DCI may include a parameter indicating whether the other UE is using remaining DL PRS resources among the DL PRS resources available by considering all beams.

As another example, in the case of configuring an on-demand DL PRS, the UE may add information on a best beam to on-demand DL PRS request information and may transmit the same. In detail, as described above, when the UE transmits, to the base station, SSB-based measurement information received from the base station, information on all the adjacent cells in relation to the UE may not be configured since the UE performs measurement through only an SSB for the corresponding base station. Also, since a QCL DL PRS is configured based on the SSB measured by the UE, there may be a slight difference from beam information in an actual DL PRS.

Considering the above, when the UE transmits on-demand DL PRS request information to the base station (serving cell), the on-demand DL PRS request information may include direction information of a best beam upon receiving the DL PRS for a serving cell and/or a non-serving cell and thereby be transmitted. Here, when the UE receives a DL PRS for the serving cell and/or the non-serving cell, the UE may acquire information on a best beam direction through an already received periodic DL PRS. Also, for example, in the case of QCL-type-D, information on the best beam direction may be additionally acquired through at least one of an SSB and a CSI-RS.

Also, the base station may transmit the on-demand DL PRS request information from the UE to the LMF. Then, the LMF may transmit DCI configuration information to the base station in consideration of the on-demand DL PRS request information. The base station may configure DCI based on the DCI configuration information and may transmit the DCI to the UE.

Here, when the aperiodic DL PRS is configured based on the on-demand DL PRS request information, the LMF may include, in the DCI configuration information, parameter information for indicating whether to use all beams or transmission in consideration of some beams, the DCI configuration information may include a parameter indicating whether the other UE is using the remaining DL PRS resources among the DL PRS resources available by considering all beams.

Then, the base station may configure DCI in consideration of the DCI configuration information and may transmit the same to the UE. Here, when the aperiodic DL PRS is configured, the base station may include, in the DCI, parameter information for indicating whether to use all beams or whether it is the DL PRS that considers only some beams (subset of beams) and may transmit the same to the UE.

Also, for example, in the case of performing DL PRS transmission in consideration of some beams, the DCI may include a parameter indicating whether the other UE is using the remaining DL PRS resources among the DL PRS available by considering all beams.

As another example, in the case of configuring an on-demand DL PRS, the UE may transmit information on a best beam and on-demand DL PRS request information through an SRS configured based on on-demand DL PRS request. That is, an SRS for an on-demand DL PRS request that is an uplink reference signal for the on-demand DL PRS request may be configured. Also, for example, an SRS for positioning may be configured as an uplink reference signal for positioning. However, it is provided as an example only for clarity of description and the present disclosure is not limited to the aforementioned example. Also, the name may be changed with a different name and thereby applied to a newly proposed communication system and may be applied in a form modified according to the new communication system.

In detail, for example, an SRS for positioning operation may be generated in the NR system. Here, 1, 2, or 4 SRS symbols may be used for "SRS for Multi Input Multi Output (MIMO)." Here, in the case of the SRS for positioning, a greater number of SRSs may be required. Therefore, 1, 2, 4, 8, or 12 SRS symbols may be used. Also, a location of an SRS symbol may use up to an $N^{th}$ (N=0, 1 . . . 13) symbol at the back of a slot. That is, an SRS symbol may be allocated based on the back of the slot. Also, for example, the number of SRS combs may be 2, 4, or 8. Description related thereto is made below. Also, for example, offset may be applied to SRS mapping and may be as shown in the following Table 16.

TABLE 16

| | $k_{offset}^{0}, \ldots, k_{offset}^{N_{symb}SRS-1}$ | | | | |
|---|---|---|---|---|---|
| $K_{TC}$ | $N_{symb}^{SRS} = 1$ | $N_{symb}^{SRS} = 2$ | $N_{symb}^{SRS} = 4$ | $N_{symb}^{SRS} = 8$ | $N_{symb}^{SRS} = 12$ |
| 2 | 0 | 0, 1 | 0, 1, 0, 1 | — | — |
| 4 | — | 0, 2 | 0, 2, 1, 3 | 0, 2, 1, 3, 0, 2, 1, 3 | 0, 2, 1, 3, 0, 2, 1, 3, 0, 2, 1, 3 |
| 8 | — | — | 0, 4, 2, 6 | 0, 4, 2, 6, 1, 5, 3, 7 | 0, 4, 2, 6, 1, 5, 3, 7, 0, 4, 2, 6 | whether it is the DL PRS that considers only some beams (subset of beams) and may transmit the same to the base station. Also, for example, in the case of performing DL PRS transmission that considers only some beams, only some of the DL PRS resources available by considering all beams may be used. Here, remaining DL PRS resources among the DL PRS resources available by considering all beams may be used by nother UE and a parameter indicating whether the other UE is using the remaining DL PRS resources may be configured. For example, in the case of performing DL PRS An SRS sequence may be a Zadoff-chu-based sequence. For example, the SRS sequence may be generated based on the following Equation 3. Here, n denotes a subcarrier index, and l' denotes a symbol. Here, $$0 \le n \le M_{sc,b}^{SRS} - 1,$$

and $$l' \in \{0, 1, \ldots, N_{symb}^{SRS} - 1\}.$$

pi denotes an antenna port. For example, since the SRS for positioning uses only a single antenna port, a value of pi may be 1. $\alpha_i$ denotes a cyclic shift (CS) value and $\alpha_i$ may be as shown in the following Equation 4 and Equation 5. Based thereon, the SRS sequence may be generated. Here, in Equation 5, $$n_{SRS}^{cs} \in (0, 1, \ldots, n_{SRS}^{cs,max} - 1\}.$$

Here, the SRS sequence may shift a phase based on the following Equation 4 and Equation 5 and maintain orthogonality.

$$r^{(p_i)}(n, l') = r_{u,v}^{(\alpha_i, \delta)}(n), \qquad \text{[Equation 3]}$$

$$\alpha_i = 2\pi \frac{n_{SRS}^{cs,i}}{n_{SRS}^{cs,max}} \qquad \text{[Equation 4]}$$

$$n_{SRS}^{cs,i} = \left( n_{SRS}^{cs} + \frac{n_{SRS}^{cs,max}(p_i - 1000)}{N_{ap}^{SRS}} \right) \bmod n_{SRS}^{cs,max} \qquad \text{[Equation 5]}$$

According to the present disclosure, the number of SRS combs may be variously set to, for example, 2, 4, or 8. For example, in the case of following the LTE system, 4 may be applicable as the number of combs and based thereon, 12 CSs may be used. The number of combs according to the present disclosure may differ according to a system applied and thereby be configured.

In the case of considering the SRS for positioning in the new communication system according to the present disclosure, if a comb size is 2, the maximum number of CSs may be 8. Also, if the comb size is 4, the maximum number of CSs may be 12. Also, since the SRS may be used for positioning, comb size=8 may be considered.

For example, the SRS for positioning may support only a single antenna port. The SRS for positioning may not support frequency hopping and 4 PRBs to 272 PRBs may be supported for frequency axis allocation based on a unit of 4 PRBs. Also, in the case of the SRS for positioning, aperiodicity may be supported in the same manner as the aperiodic SRS. Information on the antenna port, frequency hopping, frequency allocation, and periodicity may be indicated through upper end signaling.

In the case of the SRS for positioning, requirements need to be satisfied in consideration of IIoT scenario or use cases and, for this, a method of increasing orthogonality or reducing overhead may be required.

To this end, the number of SRS symbols for positioning may be 1, 2, 4, 8, or 12. Also, the comb size for positioning may be 2, 4, or 8. Here, the SRS sequence may be a phase-shift-based sequence as a Zadoff-chu sequence. Here, the CS may be a value for phase shift and each value phase-shifted based on a CS value may maintain orthogonality.

Also, for example, the UE may configure a parameter for the SRS for positioning based on upper layer signaling. In detail, the UE may configure the SRS through an SRS resource set for positioning (e.g., "SRS-PosResourceSetr16") as an upper layer parameter. Here, the SRS resource set parameter for positioning may include an SRS resource set ID parameter for positioning (e.g., srs-PosResource-SetId-r16). Here, the SRS resource set ID parameter (e.g., srs-PosResourceSetId-r16) may include a resource set ID. Also, the SRS resource set parameter for positioning may include an SRS resource list parameter for positioning (e.g., srs-PosResourceIdList-r16). Here, the SRS resource list parameter for positioning may include a list of resource IDs within the SRS resource set. Also, the SRS resource set parameter for positioning may include a resource type parameter (e.g., resourceType-r16). Here, the SRS resource set parameter for positioning may include information on whether a resource is aperiodic, semi-persistent, or periodic. Also, the SRS resource set parameter for positioning may include a pathloss related parameter for positioning (e.g., pathlossReferenceRS-Pos-r16). Here, the pathloss related parameter for positioning may include information on a reference signal that is used as reference in relation to pathloss. For example, the reference signal used as reference may be at least one of an SSB of a serving cell, an SSB of a neighboring cell, and a DL PRS and information thereon may be included in the pathloss related parameter for positioning.

Also, the UE may configure an SRS resource based on the SRS resource parameter for positioning (e.g., SRS-PosResource-r16) as the upper layer parameter. Here, the SRS resource parameter for positioning may include an SRS resource ID parameter for positioning (e.g., srs-PosResourceId-r16). Here, the SRS resource ID parameter for positioning may include the SRS resource set. Also, the SRS resource parameter for positioning may include a transmission comb parameter (e.g., transmissionComb-r16). Here, the transmission comb parameter may include information related to a transmitted comb. For example, the comb size may be one of 2, 4, and 8. Also, in detail, for example, the transmission comb parameter may indicate comb offset and cyclic prefix values for comb size=2. For example, the transmission comb parameter may indicate comb offset and cyclic prefix values for comb size=4. Also, for example, the transmission comb parameter may indicate comb offset and cyclic prefix values for comb size=8.

Also, the SRS resource parameter for positioning may include a resource mapping parameter (e.g., resourceMapping-r16). Here, the resource mapping parameter may indicate an SRS transmission start symbol within a slot. Here, the transmission start symbol may be 0 to 13. Also, the resource mapping parameter may indicate the number of symbols. For example, the number of symbols may be one of 1, 2, 4, 8, and 12.

The SRS resource parameter for positioning may include a frequency domain shift parameter (e.g., freqDomainShift-r16). Here, the frequency domain shift parameter may be information related to a start RB in the frequency domain. For example, the RB may be 0 to 268.

Also, the SRS resource parameter for positioning may include a group or sequence hopping parameter (e.g., groupOrSequenceHopping-r16). Here, the group or sequence hopping parameter may include information on whether to perform group hopping, whether to perform sequence hopping, whether to perform both types of hopping, or whether to not perform both types of hopping with respect to an SRS sequence.

Also, the SRS resource parameter for positioning may include a resource type parameter (e.g., resourceType-r16). Here, the resource type parameter may include information on whether a resource is aperiodic, semi-persistent, or periodic. For example, when the resource is aperiodic, the resource type parameter may include slot offset information. As another example, when the resource is semi-persistent or periodic, the resource type parameter may include periodicity and offset information.

Also, the SRS resource parameter for positioning may include a sequence ID parameter (e.g., sequenceId-r16). Here, the sequence ID parameter may include SRS sequence ID information.

Also, the SRS resource parameter for positioning may include an SRS spatial relation parameter (e.g., SRS-SpatialRelationInfoPos-r16). Here, the SRS spatial relation parameter may include information on a reference signal used as reference in relation to a spatial relation. For example, the reference signal used as reference may be at least one of an SSB of a serving cell, an SSB of a neighboring cell, and a DL PRS. Also, when the SSB is the reference signal used as reference, the SRS spatial relation parameter may further include cell ID and SSB index information.

Here, for example, the base station (serving cell/non-serving cell) may configure an SSB and may transmit the same to the UE. The UE may perform measurement through the SSB received from the base station. In detail, the UE may acquire information on a beam that is useful for the UE or a best beam for the UE among beams configured for the UE through the SSB received from the base station. Then, as described above, the UE may transmit on-demand DL PRS request information to the base station.

Here, the UE may transmit the on-demand PRS request information to the base station through an SRS for on-demand DL PRS request. That is, the SRS for the on-demand DL PRS request may include on-demand DL PRS request information. The on-demand DL PRS request information may include information on a best beam direction upon receiving a DL PRS for the serving cell and/or non-serving cell. The UE may measure which beams are useful for the UE among beams (SSB indexes 0 to 63) configured in the SSB based on QCL-type-D. Information on the best beam direction upon receiving the DL PRS for the serving cell and/or non-serving cell may include information on beams useful for the UE. Then, the base station may receive the SRS for the on-demand DL PRS request from the UE and, based thereon, may transmit the DL PRS to the UE.

For example, a parameter of the SRS for the on-demand DL PRS request may be set to be the same as a parameter of the SRS for positioning or may be set through modification of some parameters. In detail, the parameter of the SRS for the on-demand DL PRS request may include an SRS resource set parameter (e.g., SRS-PosResourceSet) for the on-demand DL PRS request. Here, the SRS resource set parameter for the on-demand DL PRS request may be configured based on the SRS resource set parameter for positioning (e.g., SRS-PosResourceSet-r16).

For example, the SRS resource set parameter for the on-demand DL PRS request may include an SRS resource set ID parameter (e.g., srs-PosResourceSetId). The SRS resource set ID parameter may include ID information based on the base station that is a target of the on-demand DL PRS request. That is, when the target base station is A, a parameter for the SRS resource set ID may be set to A. When the target base station is B, the parameter for the SRS resource set ID may be set to B.

Also, the SRS resource set parameter for the on-demand DL PRS request may include an SRS resource ID list parameter (e.g., srs-PosResourceIdList). The SRS resource ID list parameter (e.g., srs-PosResourceIdList) may be identically set to an SRS resource ID list parameter for positioning (e.g., srs-PosResourceIdList-r16).

Also, the SRS resource set parameter for the on-demand DL PRS request may include a resource type parameter (e.g., resource Type). The resource type parameter (e.g., resource Type) may be set only to be aperiodic in consideration of the fact that it is the SRS for the on-demand DL PRS request.

Also, the SRS resource set parameter for the on-demand DL PRS request may include a pathloss parameter (e.g., pathlossReferenceRS-Pos). The pathloss parameter (e.g., pathlossReferenceRS-Pos) may include information on the reference signal that is used as reference. For example, the reference signal that is used as reference may be at least one of an SSB of a serving cell and an SSB of a neighboring cell based on the base station that is a target of the on-demand DL PRS request.

Also, a parameter of the SRS for the on-demand DL PRS request may include an SRS resource parameter for the on-demand DL PRS request (e.g., SRS-PosResource). Here, the SRS resource parameter for the on-demand DL PRS request may be configured based on an SRS resource parameter for positioning (e.g., SRS-PosResource-r16).

Here, the SRS resource parameter for the on-demand DL PRS request may include an SRS resource ID parameter (e.g., srs-PosResourceId). The SRS resource ID parameter may include resource ID information of the base station that is a target of the on-demand PRS request (i.e., base station identified with SRS-PosResourceSet). Here, the resource ID information may use a resource ID corresponding to a best beam index in an SSB. In detail, the UE may measure which beams are useful for the UE based on QCL-type-D among beams configured in the SSB (SSB indexes 0 to 63). Also, as described above, information on the best beam direction upon receiving the DL PRS for the serving cell and/or the non-serving cell may include information on beams useful for the UE and resource ID information may be configured based thereon.

Also, the SRS resource parameter for the on-demand DL PRS request may include a transmission comb parameter (e.g., transmissionComb). The transmission comb parameter may be identically set to a transmission comb parameter (e.g., transmissionComb-r16) of the SRS for positioning. As another example, the transmission comb parameter may add comb 1 (Comb-1) to the transmission comb parameter of the SRS for positioning in consideration of latency. As another example, the transmission comb parameter may delete at least one of comb 2 (Comb-2), comb 4 (Comb-4), and comb 8 (Comb-8) from the transmission comb parameter of the SRS for positioning in consideration of latency. However, the present disclosure is not limited to the aforementioned example.

Also, the SRS resource parameter for the on-demand DL PRS request may include a resource mapping parameter (e.g., resourceMapping). The resource mapping parameter may be identically set to a resource mapping parameter (e.g., resourceMapping-r16) of the SRS for positioning. As another example, the resource mapping parameter may be configured with a portion of the resource mapping parameter of the SRS for positioning. Alternatively, the resource mapping parameter may be configured by deleting a partial configuration from the resource mapping parameter of the SRS for positioning.

Also, the SRS resource parameter for the on-demand DL PRS request may include a frequency domain shift parameter (e.g., freqDomainShift). The frequency domain shift parameter may be identically set to a frequency domain shift parameter (e.g., freqDomainShift-r16) of the SRS for positioning. As another example, the frequency domain shift parameter may be configured with a portion of the frequency domain shift parameter of the SRS for positioning. As another example, the frequency domain shift parameter may be configured by deleting a partial configuration from the frequency domain shift parameter of the SRS for positioning.

Also, the SRS resource parameter for the on-demand DL PRS request may include a group or sequence hopping parameter (e.g., groupOrSequenceHopping). The group or sequence hopping parameter may be identically set to a group or sequence parameter (e.g., groupOrSequenceHopping-r16) of the SRS for positioning.

Also, the SRS resource parameter for the on-demand DL PRS request may include a resource type parameter (e.g., resourceType). The resource type parameter may be identically set to a resource type parameter (e.g., resourceType-r16) of the SRS for positioning. As another example, the resource type parameter is a parameter for the on-demand PRS request and thus, may be set only to be aperiodic.

Also, the SRS resource parameter for the on-demand DL PRS request may include a sequence ID parameter (e.g., sequenceId). The sequence ID parameter may be configured by including information on a cell ID of a target base station that is a target of the on-demand PRS request. For example, in the case of configuring an actual SRS sequence, the actual SRS sequence may be configured by including, in an initial value, the cell ID of the target base station that is the target of the on-demand DL PRS request.

Also, the SRS resource parameter for the on-demand DL PRS request may include an SRS spatial relation parameter (e.g., SRS-SpatialRelationInfoPos). The SRS spatial relation parameter may include information on a reference signal used as reference in relation to a spatial relation. Here, the reference signal used as reference may be at least one of an SSB of a serving cell and an SSB of a neighboring cell according to a base station that is a target of the on-demand DL PRS request. For example, when the SSB is the reference signal used as reference, a cell ID may be configured with a cell ID of the target base station that is the target of the on-demand DL PRS request. Also, the SSB index may include an SSB index corresponding to a best beam index based on QCL-type-D.

As another example, when the aperiodic DL PRS is configured, a parameter indicating whether a DL PRS considers all beams or considers some beams (subset of beams) may be configured. As described above, the existing DL PRS may configure a DL PRS resource by considering all beams. Here, in the case of the on-demand DL PRS, the DL PRS resource may consider only some beams. In detail, for example, when on-demand DL PRS configuration is triggered by the UE (UE-assisted and/or UE-based positioning), the base station may configure a UE-specific DL PRS and may transmit the same to the UE. Here, a system (or network) may configure the DL PRS in consideration of a beam (e.g., best beam of the UE) related to the UE instead of the DL PRS that considers all the beams and, based thereon, may transmit the DL PRS to the UE.

Each of UEs may have different requirements for DL PRS transmission. In detail, positioning accuracy and latency required for each of the UEs may be different. Also, since each of the UEs has a different beam direction corresponding to a TRP, requirements related to the DL PRS transmission in the UE may be different. Here, for example, in the case of a UE having great requirements for device efficiency (e.g., reducing the resource usage and power saving) among the UEs, DL PRS configuration for the corresponding UE may consider only transmission of some beams. Although the DL PRS may be transmitted through dynamic signaling in association with the aperiodic DL PRS, the present disclosure is not limited to the aforementioned example.

Here, a case in which the number of groups for some beams (subset of beams) is N may be considered as a case in which the DL PRS configuration uses only some beams (subset of beams). That is, a case in which N groups for some beams are present may be considered. A beam configuration related parameter for a DL PRS may use k bits. Here, k may be $\lceil \log_2(N+1) \rceil$. For example, if a bit value is set to 0, the DL PRS may be configured to use all beams. On the contrary, unless the bit value is 0, the DL PRS may use some beams belonging to a specific group.

As another example, the beam configuration related parameter for the DL PRS may use an N-bit bitmap. In detail, the entire beams may be divided into N groups and each group may correspond to a single bit value. Here, if a bit value is a first value (e.g., 1), a beam of a corresponding group may not be used. If the bit value is a second value (e.g., 0), the beam of the corresponding group may be used. That is, beams of a group corresponding to a bit having the first value in the N-bit bitmap may be used as some beams. For example, if all of N bits have the first value, all beams may be used.

Here, for example, each group for beams may include at least one DL PRS resource (e.g., nr-DL-PRS-Resource-r17) within at least one same DL PRS resource set (e.g., nr-DL-PRS-ResourceSet-r17). Therefore, a list for DL PRS resource IDs (e.g., nr-DL-PRS-ResourceId-r16) indicating DL PRS resources included in each group may be configured with parameter values.

Here, DL PRS resources included in each group may allow at least one value of the following Table 17 to have the same value. For example, DL PRS resources may have the same value based on priority in the following Table 17 in consideration of use of other resources and 1) may have the top priority. That is, DL PRS resources within a group may be configured to have the same value in order of 1) to 4). The present disclosure is not limited to the aforementioned example. Also, for example, a parameter for a beam used in association with DL PRS configuration may be configured with a lower field within a DL PRS resource set parameter (e.g., nr-DL-PRS-ResourceSet-r17).

As another example, the parameter for the beam used in association with the DL PRS configuration may be configured with a lower field within a DL PRS resource parameter (e.g., nr-DL-PRS-Resource-r17).

TABLE 17

1) dl-PRS-ResourceSlotOffset-r16
2) dl-PRS-ResourceSymbolOffset-r16
3) dl-PRS-NumSymbols-r16
4) dl-PRS-ReOffset-r16

As another example, in the case of DL PRS configuration that considers only some beams, DL PRS resources may use only some of DL PRS resources used by considering all beams. Only a DR PRS resource for a specific comb pattern corresponding to some beams may be used for the DL PRS configuration. Here, the UE needs to verify whether resources not used for the DL PRS configuration are being used by other UEs. For example, the UE may need to verify whether it is possible to use resources not used for the DL PRS configuration in consideration of rating matching. To this end, the base station may dynamically signal whether resources not used for the DL PRS configuration are being used by another UE.

A case in which the number of groups for some beams is N may be considered. For example, as described above, a beam used for the DL PRS configuration may be indicated through an N-bit bitmap. That is, the entire beams may be divided into N groups and each group may correspond to a single bit value and may not be used if a bit value is a second value (e.g., 0) and may be used if the bit value is a first value (e.g., 1). Here, even for a group of some beams used for the DL PRS for another UE, N groups may be configured to correspond to the above N groups. Here, an N-bit bitmap corresponding to a group of some beams used for the DL PRS for the other UE may be used. For example, a bit value corresponding to a group for some beams used for the DL PRS for the other UE may be the first value and a bit value corresponding to a case of not being used may be the second value. For example, the UE may determine that DL PRS resources related to some beams of the bit corresponding to a case in which the bit value is the second value are not used for other UEs and may use the same.

Here, each group may include at least one DL PRS resource (e.g., nr-DL-PRS-Resource-r17) within at least one same DL PRS resource set (e.g., nr-DL-PRS-ResourceSet-r17). Therefore, a list for DL PRS resource IDs (e.g., nr-DL-PRS-ResourceId-r16) indicating DL PRS resources included in each group may be configured with parameter values. Here, DL PRS resources included in each group may allow at least one value of the above Table 17 to have the same value. Here, for example, DL PRS resources included in each group may have the same value based on priority in the above Table 17 and 1) may have the top priority. That is, DL PRS resources within a group may be configured to have the same value in order of 1) to 4). The present disclosure is not limited to the aforementioned example.

Also, for example, a parameter for some beams used for a DL PRS for another UE may be configured with a lower field within a DL PRS resource set parameter (e.g., nr-DL-PRS-ResourceSet-r17) in association with the DL PRS configuration.

As another example, the parameter for some beams used for the DL PRS for the other UE may be configured with a lower field within a DL PRS resource parameter (e.g., nr-DL-PRS-Resource-r17) in association with the DL PRS configuration.

As another example, the parameter for some beams used for the DL PRS for the other UE may be configured as a pair within the same field as a parameter for a beam used in association with the DL PRS configuration.

As another example, when an aperiodic DL PRS is configured, an additional parameter for indicating presence or absence of existing periodic DL PRS transmission may be required. For example, when the aperiodic DL PRS is configured within a specific DL PRS occasion in consideration of device efficiency, a periodic DL PRS may not be transmitted in a corresponding DL PRS occasion or a subsequent DL PRS occasion and through this, the device efficiency may be improved. However, although the aperiodic DL PRS is configured, positioning accuracy may be improved if the existing periodic DL PRS is transmitted. Considering above, the periodic DL PRS needs to be maintained. Therefore, when the aperiodic DL PRS is configured, dynamic signaling regarding whether to maintain the periodic DL PRS may be required.

Here, corresponding signaling may be set to 1 bit. For example, if a bit value is the first value, periodic DL PRS transmission may be performed. That is, the periodic DL PRS transmission may be in an "ON" state. On the contrary, if the bit value is the second value, periodic DL PRS transmission may not be performed. That is, the periodic DL PRS transmission may be in an "OFF" state.

Here, when the periodic DL PRS transmission is in an "ON" state, the periodic DL PRS transmission may be performed based on upper layer signaling (e.g., RRC) in the same manner. Since the periodic DL PRS transmission is performed, the UE may decode the DL PRS based on the existing information.

On the contrary, when the periodic DL PRS transmission is in an "OFF" state, an aperiodic DL PRS may be configured in a DL PRS occasion n for the existing periodic DL PRS transmission. When the periodic DL PRS is not yet performed, the periodic DL PRS transmission may not be performed in the DL PRS occasion n.

On the contrary, when the periodic DL PRS transmission is in an "OFF" state, the aperiodic DL PRS may be configured in the DL PRS occasion n for the existing periodic DL PRS transmission. When the periodic DL PRS transmission is already performed, the periodic DL PRS transmission may not be performed in a DL PRS occasion n+1 that is a subsequent DL PRS occasion. Since it is indicated that the periodic DL PRS is not transmitted in a specific DL PRS occasion, the UE may not perform decoding thereof. Here, for example, a parameter indicating whether to suspend the periodic DL PRS transmission may be an additional parameter included in a DL PRS resource set parameter (e.g., nr-DL-PRS-ResourceSet-r17) and through this, the aforementioned information may be signaled.

As another example, a parameter indicating whether to suspend the periodic DL PRS transmission may be an additional parameter included in a DL PRS resource parameter (e.g., nr-DL-PRS-Resource-r17) and through this, the aforementioned information may be signaled.

As another example, signaling may be performed by setting a parameter indicating whether to suspend the periodic DL PRS transmission to a separate 1-bit field regardless of the DL PRS resource set. The present disclosure is not limited to the aforementioned example.

Figure 14:
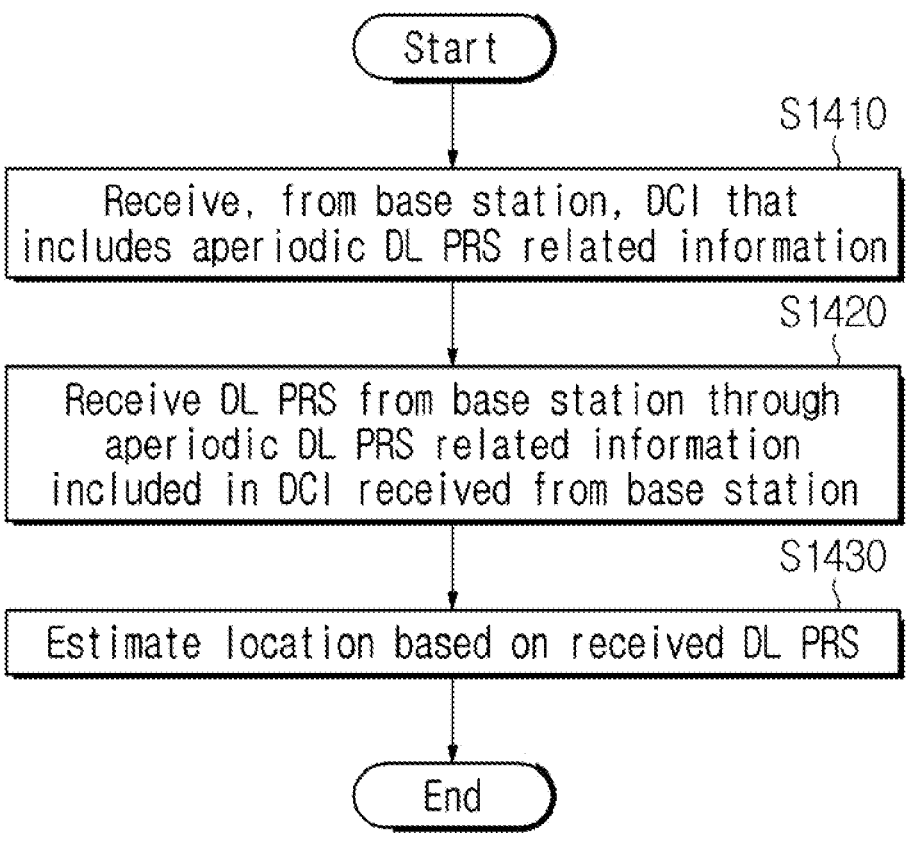
FIG. 14 is a flowchart illustrating a method of receiving an aperiodic DL PRS applicable to the present disclosure.

FIG. 14 is a flowchart illustrating a method of receiving an aperiodic DL PRS applicable to the present disclosure.

Referring to FIG. 14, in operation S1410, a UE may receive, from a base station, DCI that includes aperiodic DL PRS related information. Here, the DCI may include a field that includes aperiodic DL PRS related information and, based thereon, an aperiodic DL PRS resource trigger list may be indicated. Here, an aperiodic DL PRS resource trigger list value may be k and an aperiodic DL PRS resource set parameter may be configured for each aperiodic DL PRS resource trigger list value. Also, an aperiodic DL PRS resource parameter for each DL PRS resource may be included in the aperiodic DL PRS resource set parameter.

Here, for example, the aperiodic DL PRS resource set parameter may be configured by modifying and deleting parameters included in the periodic DL PRS resource set parameter (e.g., nr-DL-PRS-ResourceSet-r16) to be suitable for an aperiodic environment.

Also, for example, as described above, the aperiodic DL PRS resource parameter may be configured by modifying and deleting parameters included in the periodic DL PRS resource parameter (e.g., nr-DL-PRS-Resource-r16) to be suitable for the aperiodic environment.

Also, for example, when the UE performs aperiodic DL PRS transmission, the UE may transmit an aperiodic DL PRS in association with another channel/signal and a parameter for indicating the same may be configured. The parameter may be indicated through dynamic signaling.

Also, for example, in the case of the aperiodic DL PRS transmission, the DL PRS may consider only transmission of some beams not all beams in consideration of device efficiency and a parameter for indicating the same may be configured. Here, the parameter may be indicated through dynamic signaling.

Also, in the case of the aperiodic DL PRS that considers only some beams (subset of beams), only some of PRS resources may be used. Therefore, remaining resources may be used by other UEs and a parameter for indicating the same may be configured. Here, the parameter may be indicated through dynamic signaling.

Also, for example, when the aperiodic DL PRS is configured in the UE, the UE may need to determine whether to maintain the existing periodic DL PRS transmission. That is, the UE may need to determine whether to overlappingly perform periodic DL PRS transmission together with aperiodic DL PRS transmission. Therefore, when the aperiodic DL PRS is configured in the UE, an additional parameter for indicating presence or absence of the existing DL PRS transmission may be configured. Here, the parameter may be indicated through dynamic signaling.

Also, for example, the UE may receive an SSB from the base station and, based thereon, may perform measurement. Then, the UE may transmit SSB-based measurement information to the base station and the base station may transmit the same to an LMF. As described above, the base station may receive configured QCL information and DCI configuration information from the LMF and, based thereon, may transmit, to the UE, DCI that includes aperiodic DL PRS related information. In operation S1420, the UE may receive a DL PRS through the aperiodic DL PRS related information included in the DCI received from the base station. In operation S1430, the UE may perform positioning based on the received DL PRS.

Figure 15:
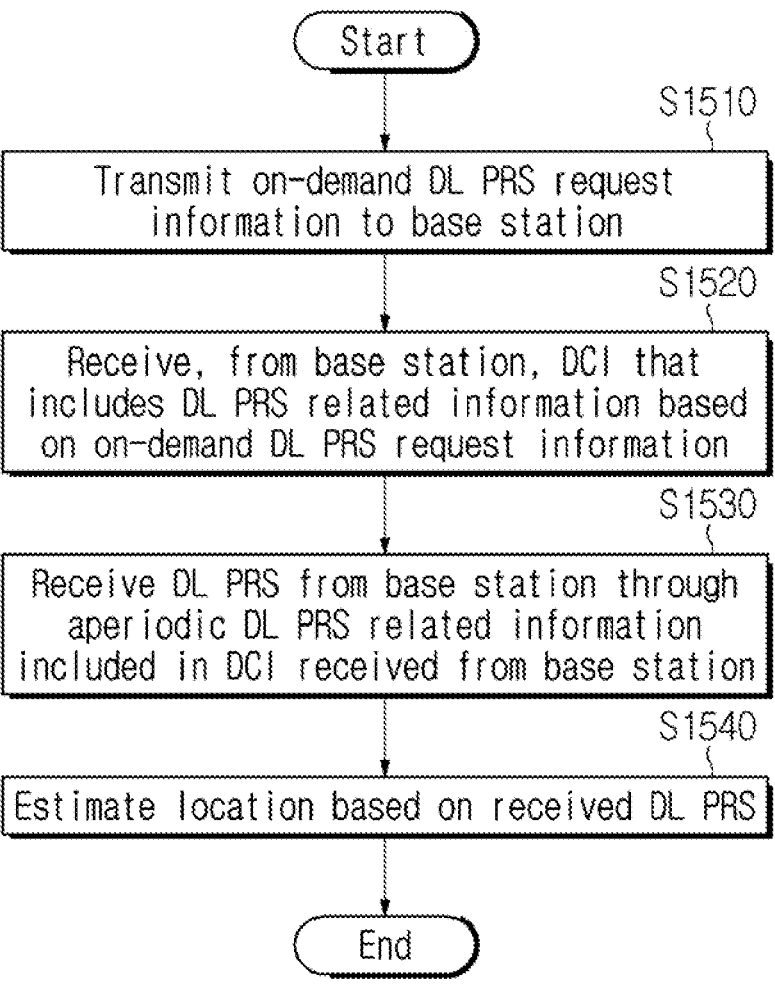
FIG. 15 is a flowchart illustrating a method of receiving an on-demand DL PRS applicable to the present disclosure.

FIG. 15 is a flowchart illustrating a method of receiving an on-demand DL PRS applicable to the present disclosure.

In operation S1510, a UE may transmit on-demand DL PRS request information to a base station. For example, the UE may transmit the on-demand DL PRS request information to the base station. Here, the on-demand DL PRS request information may be transmitted by including direction information of a best beam upon receiving a DL PRS for a serving cell and/or a non-serving cell.

Here, when the UE receives a DL PRS for the serving cell and/or the non-serving cell, the UE may acquire information on a best beam direction through the already received periodic DL PRS. Also, for example, in the case of QCL-type-D, information on the best beam direction may be additionally acquired through at least one of an SSB and a CSI-RS.

Also, the base station may transmit the on-demand DL PRS request information from the UE to an LMF. The LMF may transmit DCI configuration information to the base station in consideration of the on-demand DL PRS request information.

As another example, the on-demand DL PRS request information may be transmitted to the base station based on an SRS for an on-demand DL PRS request. Here, as described above, a parameter of an SRS for the on-demand DL PRS request may be configured by modifying and deleting a parameter of the SRS for positioning.

In operation S1520, the UE may receive, from the base station, DCI that includes DL PRS related information configured based on the on-demand DL PRS request information.

mation. Here, the DCI may include a field that includes aperiodic DL PRS related information and, based thereon, an aperiodic DL PRS resource trigger list may be indicated. Here, an aperiodic DL PRS resource trigger list value may be k and an aperiodic DL PRS resource set parameter may be configured for each aperiodic DL PRS resource trigger list value. Also, the aperiodic DL PRS resource parameter for each DL PRS resource may be included in the aperiodic DL PRS resource set parameter.

Here, for example, as described above, the aperiodic DL PRS resource set parameter may be configured by modifying and deleting parameters included in the periodic DL PRS resource set parameter (e.g., nr-DL-PRS-ResourceSet-r16) to be suitable for an aperiodic environment.

Also, for example, as described above, the aperiodic DL PRS resource parameter may be configured by modifying and deleting parameters included in the periodic DL PRS resource parameter (e.g., nr-DL-PRS-Resource-r16) to be suitable for the aperiodic environment.

Also, for example, when the UE performs aperiodic DL PRS transmission, the UE may transmit an aperiodic DL PRS in association with another channel/signal and a parameter for indicating the same may be configured. Here, the parameter may be indicated through dynamic signaling. Also, for example, in the case of the aperiodic DL PRS transmission, the DL PRS may consider only transmission of some beams not all beams in consideration of device efficiency and a parameter for indicating the same may be configured. Here, the parameter may be indicated through dynamic signaling.

Also, in the case of the aperiodic DL PRS that considers only some beams (subset of beams), only some of PRS resources may be used. Therefore, remaining resources may be used by other UEs and a parameter for indicating the same may be configured. Here, the parameter may be indicated through dynamic signaling.

Also, for example, when the aperiodic DL PRS is configured in the UE, the UE may need to determine whether to maintain the existing periodic DL PRS transmission. That is, the UE may need to determine whether to overlappingly perform periodic DL PRS transmission together with aperiodic DL PRS transmission. Therefore, when the aperiodic DL PRS is configured in the UE, an additional parameter for indicating presence or absence of the existing DL PRS transmission may be configured. Here, the parameter may be indicated through dynamic signaling.

Also, for example, the UE may receive an SSB from the base station and, based thereon, may perform measurement. Then, the UE may transmit SSB-based measurement information to the base station and the base station may transmit the same to an LMF. As described above, the base station may receive configured QCL information and DCI configuration information from the LMF and, based thereon, may transmit, to the UE, DCI that includes the aperiodic DL PRS related information.

In operation S1530, the UE may receive a DL PRS through the aperiodic DL PRS related information included in the DCI received from the base station. In operation S1540, the UE may perform positioning based on the received DL PRS.

Figure 16:
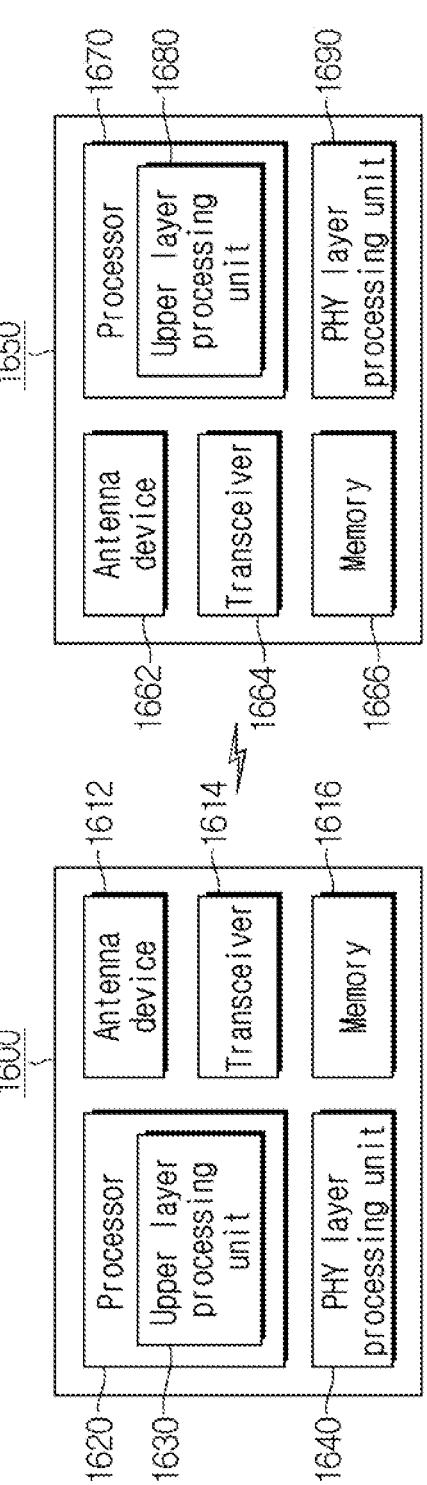
FIG. 16 is a diagram illustrating a base station device and a terminal device to which the present disclosure may apply.

FIG. 16. is a diagram illustrating a configuration of a base station device and a terminal device to which the present disclosure may apply.

A base station device 1600 may include a processor 1620, an antenna device 1612, a transceiver 1614, and a memory 1616.

The processor 1620 may perform baseband related signal processing and may include an upper layer processing unit 1630 and a physical (PHY) layer processing unit 1640. The upper layer processing unit 1630 may process an operation of a medium access control (MAC) layer, a radio resource control (RRC) layer, or more upper layers. The PHY layer processing unit 1640 may process an operation (e.g., uplink received signal processing, downlink transmission signal processing, etc.) of a PHY layer. The processor 1620 may also control the overall operation of the base station device 1600, in addition to performing the baseband related signal processing.

The antenna device 1612 may include at least one physical antenna. If the antenna device 1612 includes a plurality of antennas, multiple input multiple output (MIMO) transmission and reception may be supported. Also, beamforming may be supported. Here, the antenna device 1612 supports MIMO transmission and reception and beamforming through an antenna pattern in an antenna array that includes the plurality of antennas. A different antenna port index is allocated to an antenna port according to a transmission channel type. Here, the plurality of antennas may have the same antenna port index. Therefore, although a single antenna port is used, the number of actual physical antennas may be plural. In the SRS transmission, the plurality of antenna ports may be used. However, in the SRS transmission for positioning of the present disclosure, only a single antenna port may be used. The transceiver 1614 may include a radio frequency (RF) transmitter and an RF receiver.

The memory 1616 may store operation-processed information of the processor 1620, software, an operating system (OS), and an application related to an operation of the base station device 1600, and the like, and may include a component, such as a buffer. The processor 1620 of the base station 1600 may be configured to implement an operation of a base station set forth herein.

A terminal device 1650 may include a processor 1670, an antenna device 1662, a transceiver 1664, and a memory 1666. For example, in the present disclosure, the terminal device 1650 may communicate with the base station device 1600. As another example, in the present disclosure, the terminal device 1650 may perform sidelink communication with another terminal device. That is, the terminal device 1650 of the present disclosure refers to any device capable of communicating with at least one of the base station device 1600 and another terminal device and is not limited to communication with a specific device.

The processor 1670 may perform baseband related signal processing and may include an upper layer processing unit 1680 and a PHY layer processing unit 1690. The upper layer processing unit 1680 may process an operation of a MAC layer, an RRC layer, or more upper layers. The PHY layer processing unit 1690 may process an operation (e.g., downlink received signal processing, uplink transmission signal processing, etc.) of a PHY layer. The processor 1670 may control the overall operation of the terminal device 1650 in addition to performing the baseband related signal processing.

The antenna device 1662 may include at least one physical antenna. If the antenna device 1662 includes a plurality of antennas, MIMO transmission and reception may be supported. Also, beamforming may be supported. Here, the antenna device 1662 supports MIMO transmission and beamforming through an antenna pattern in an antenna array that includes the plurality of antennas. A different antenna port index is allocated to an antenna port according to a transmission channel type. Here, the plurality of antennas may have the same antenna port index. Therefore, although a single antenna port is used, the number of actual physical antennas may be plural. In the SRS transmission, a plurality of antenna ports may be used. However, in the SRS transmission for positioning of the present disclosure, only a single antenna port may be used. The transceiver 1664 may include an RF transmitter and an RF receiver.

The memory 1666 may store operation-processed information of the processor 1670, software, an OS, and an application related to an operation of the terminal device 1650, and the like, and may include a component, such as a buffer.

Here, the processor 1670 of the terminal device 1650 may receive, from the base station 1600, DCI that includes aperiodic DL PRS related information. Here, the DCI may include a field that includes the aperiodic DL PRS related information and, based thereon, an aperiodic DL PRS resource trigger list may be indicated.

Here, for example, as described above, an aperiodic DL PRS resource set parameter may be configured by modifying and deleting parameters included in a periodic DL PRS resource set parameter (e.g., nr-DL-PRS-ResourceSet-r16) to be suitable for an aperiodic environment.

Also, for example, the aperiodic DL PRS resource parameter may be configured by modifying and deleting parameters included in a periodic DL PRS resource parameter (e.g., nr-DL-PRS-Resource-r16) to be suitable for the aperiodic environment.

Also, for example, when the terminal device 1650 performs aperiodic DL PRS transmission, the processor 1670 of the terminal device 1650 may transmit an aperiodic DL PRS in association with another channel/signal and a parameter for indicating the same may be configured. Here, the parameter may be indicated through dynamic signaling.

Also, for example, in the case of aperiodic DL PRS transmission, the DL PRS may consider only transmission of some beams not all beams in consideration of device efficiency and a parameter for indicating the same may be configured. Here, the parameter may be indicated through dynamic signaling.

Also, in the case of aperiodic DL PRS that considers only some beams (subset of beams), only some of PRS resources may be used. Therefore, remaining resources may be used by other UEs and a parameter for indicating the same may be configured. Here, the parameter may be indicated through dynamic signaling.

Also, for example, when the aperiodic DL PRS is configured in the terminal device 1650, the processor 1670 of the terminal device 1650 may need to determine whether to maintain the existing periodic DL PRS transmission. That is, the processor 1670 of the terminal device 1650 may need to determine whether to overlappingly perform periodic DL PRS transmission together with aperiodic DL PRS transmission. Therefore, when the aperiodic DL PRS is configured in the terminal device 1650, an additional parameter for indicating presence or absence of the existing DL PRS transmission may be configured. Here, the parameter may be indicated through dynamic signaling.

Also, for example, the processor 1670 of the terminal device 1650 may receive an SSB from the base station device 1600 and, based thereon, may perform measurement. Then, the processor 1670 of the terminal device 1650 may transmit SSB based measurement information to the base station device 1600 and the base station device 1600 may transmit the same to an LMF. As described above, the base station device 1600 may receive configured QCL information and DCI configuration information from the LMF and, based thereon, may transmit, to the terminal device 1650, DCI that includes aperiodic DL PRS related information.

Then, the processor 1670 of the terminal device 1650 may receive a DL PRS through the aperiodic DL PRS related information included in the DCI received from the base station device 1600. Then, the processor 1670 of the terminal device 1650 may perform positioning based on the received DL PRS.

As another example, the processor 1670 of the terminal device 1650 may transmit on-demand DL PRS request information to the base station device 1600. For example, the processor 1670 of the terminal device 1650 may transmit the on-demand DL PRS request information to the base station device 1600. Here, the on-demand DL PRS request information may be transmitted by including direction information of a best beam upon receiving a DL PRS for a serving cell and/or non-serving cell.

Here, when the terminal device 1650 receives a DL PRS for the serving cell and/or non-serving cell, the processor 1670 of the terminal device 1650 may acquire information on a best beam direction through an already received periodic DL PRS. Also, for example, in the case of QCL-type-D, information on the best beam direction may be additionally acquired through at least one of an SSB and a CSI-RS.

Also, the base station device 1600 may transmit the on-demand DL PRS request information from the terminal device 1650 to the LMF. Then, the LMF may transmit DCI configuration information to the base station device 1600 in consideration of the on-demand DL PRS request information.

As another example, the processor 1670 of the terminal device 1650 may include the on-demand DL PRS request information in an SRS for on-demand DL PRS request and may transmit the same to the base station device 1600. Here, as described above, a parameter of an SRS for the on-demand DL PRS request may be configured by modifying and deleting the parameter of the SRS for positioning.

Hereinafter, the IIoT to which the present disclosure applies includes an industrial part of computer that includes manufacture and energy management and a device, such as a sensor, equipment, etc., interconnected over a network. Communication/connection of each unit according to the present disclosure includes communicability through 5G, an NR wireless communication system, and a system that supports enhanced communication technology based on LTE/LTE-A. An IIoT system to which the present disclosure applies is developed from a distributed control system (DCS) and enables a high-level automation using cloud computing to improve a process control. The IIoT system to which the present disclosure applies may include a layered modular structure of digital technology. A user interface device of the IIoT system to which the present disclosure applies may include a wireless processing device capable of processing an application and content, including a screen configuration device, a tablet, a smart grass, and the like. This wireless processing device may include an application software and processing unit configured to analyze data and to convert the analyzed data to information. CPS, sensor, machine, and network layers include a physical network bus, cloud computing, and communication protocols configured to collect and transmit data to a service layer. The service layer may also include what is implemented through a separate unit of a communication device configured to configure and process a PRS and an SRS according to application of the present disclosure. Therefore, the service layer of the IIoT system according to the present disclosure may be configured as an application configured to manipulate data and to merge the data into information displayable on a driver dashboard, and may be displayed through a content layer that is a top layer, that is, through a screen and a display unit and through a wireless processing device.

Also, various examples of the present disclosure may be implemented by hardware, firmware, software, or combination thereof. In the case of implementation by hardware, the examples may be implemented by one or more application-specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc.

The scope of the present disclosure includes software or machine-executable instructions (e.g., OS, application, firmware, program, etc.) such that operations of the method of the various examples may be executed on an apparatus or a computer, and a non-transitory computer-readable medium storing such software or instructions to be executable on an apparatus or a computer.

Various examples of the present disclosure are to explain representative aspects of the present disclosure rather than listing all the possible combinations and matters described in the various examples may be applied alone or in combination of at least two of the examples.

What is claimed is:

1. A method performed by a wireless user device, the method comprising:

receiving, from a base station, a downlink (DL) positioning reference signal (PRS) configuration indicating DL PRS muting and a DL PRS resource set, wherein the DL PRS resource set comprises a plurality of DL PRS resources, and wherein the DL PRS configuration further indicates at least one of:

a DL PRS transmission periodicity for the DL PRS resource set; or a DL PRS resource time gap;

transmitting, to the base station, on-demand DL PRS request information, wherein the on-demand DL PRS request information comprises information of a synchronization signal block (SSB) index corresponding to a beam, and wherein the SSB index corresponds to one of 0, 1, 2, . . . , or 63;

receiving, based on the on-demand DL PRS request information, a response;

receiving, from the base station, a DL PRS associated with the SSB index; and receiving, from the base station, at least one SSB, wherein the beam corresponding to the SSB index is based on a measurement of the at least SSB, wherein the beam corresponds to a suitable beam for the wireless user device, and wherein, for quasi-colocation (QCL) type-D, the information of the SSB index corresponding to the beam indicates at least one of:

direction information of a suitable beam for receiving DL PRS of a serving cell; or direction information of a suitable beam for receiving DL PRS of a non-serving cell.

2. The method of claim 1, further comprising at least one of:

determining, based on the received DL PRS, a reference signal time difference (RSTD) measurement; or estimating, based on the received DL PRS, a location.

3. The method of claim 1, wherein the receiving the response comprises receiving, from a location management function (LMF) and via the base station, the response, and wherein the response comprises quasi-colocation (QCL) information.

4. The method of claim 1, further comprising:

transmitting, to the base station, measurement information of an SSB corresponding to the SSB index to cause the base station to transmit the measurement information to a location management function (LMF).

5. The method of claim 1, wherein the on-demand DL PRS request information indicates at least one of:

a parameter related to DL PRS resource repetition factor;

a parameter related to a DL PRS resource bandwidth; or a parameter related to DL PRS number of symbols.

6. The method of claim 1, wherein the on-demand DL PRS request information excludes:

a parameter related to a DL PRS muting; and a parameter related to a system frame number (SFN) offset.

7. A method performed by a wireless user device, the method comprising:

receiving, from a base station, a downlink (DL) positioning reference signal (PRS) configuration indicating DL PRS muting and a DL PRS resource set, wherein the DL PRS resource set comprises a plurality of DL PRS resources;

transmitting, to the base station, on-demand DL PRS request information, wherein the on-demand DL PRS request information comprises information of a synchronization signal block (SSB) index corresponding to a beam, wherein the SSB index corresponds to one of 0, 1, 2, . . . , or 63, and wherein the on-demand DL PRS request information indicates at least one of:

a parameter related to DL PRS resource repetition factor;

a parameter related to a DL PRS resource bandwidth; or a parameter related to DL PRS number of symbols;

receiving, based on the on-demand DL PRS request information, a response;

receiving, from the base station, a DL PRS associated with the SSB index; and receiving, from the base station, at least one SSB, wherein the beam corresponding to the SSB index is based on a measurement of the at least SSB, wherein the beam corresponds to a suitable beam for the wireless user device, and wherein, for quasi-colocation (QCL) type-D, the information of the SSB index corresponding to the beam indicates at least one of:

direction information of a suitable beam for receiving DL PRS of a serving cell; or direction information of a suitable beam for receiving DL PRS of a non-serving cell.

8. The method of claim 7, further comprising at least one of:

determining, based on the received DL PRS, a reference signal time difference (RSTD) measurement; or estimating, based on the received DL PRS, a location.

9. The method of claim 7, wherein the receiving the response comprises receiving, from a location management function (LMF) and via the base station, the response, and wherein the response comprises quasi-colocation (QCL) information.

10. The method of claim 7, further comprising:

transmitting, to the base station, measurement information of an SSB corresponding to the SSB index to cause the base station to transmit the measurement information to a location management function (LMF).

11. The method of claim 7, wherein the on-demand DL PRS request information excludes:

a parameter related to a DL PRS muting; and a parameter related to a system frame number (SFN) offset.

* * * * *